(12) United States Patent
Kweon et al.

(10) Patent No.: US 10,440,618 B2
(45) Date of Patent: Oct. 8, 2019

(54) APPARATUS AND METHOD FOR MANAGING MOBILITY IN WIRELESS COMMUNICATION SYSTEM

(71) Applicant: Samsung Electronics Co., Ltd., Suwon-si, Gyeonggi-do (KR)

(72) Inventors: Ki-Suk Kweon, Suwon-si (KR); Alper Yegin, Istanbul (TR); Jung-Shin Park, Seoul (KR); Jin-Sung Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 311 days.

(21) Appl. No.: 15/033,819

(22) PCT Filed: Nov. 7, 2014

(86) PCT No.: PCT/KR2014/010685
§ 371 (c)(1),
(2) Date: May 2, 2016

(87) PCT Pub. No.: WO2015/069060
PCT Pub. Date: May 14, 2015

(65) Prior Publication Data
US 2016/0286441 A1    Sep. 29, 2016

Related U.S. Application Data

(60) Provisional application No. 61/901,112, filed on Nov. 7, 2013.

(30) Foreign Application Priority Data

Nov. 5, 2014    (KR) .................. 10-2014-0152971

(51) Int. Cl.
*H04W 4/00*    (2018.01)
*H04W 36/00*    (2009.01)
(Continued)

(52) U.S. Cl.
CPC ....... *H04W 36/0066* (2013.01); *H04W 8/082* (2013.01); *H04W 36/0016* (2013.01);
(Continued)

(58) Field of Classification Search
USPC ........ 370/229, 230, 235, 236, 252, 328, 331
See application file for complete search history.

(56) References Cited

U.S. PATENT DOCUMENTS 8,379,599 B2 * 2/2013 Velev .................... H04W 8/082
                                                                370/331
9,319,292 B2 * 4/2016 Wyatt .................... H04L 63/20
(Continued)

FOREIGN PATENT DOCUMENTS

EP            2 675 215 A2    12/2013
KR    10-2008-0086781 A     9/2008
(Continued)

*Primary Examiner* — Kwang B Yao
*Assistant Examiner* — Nguyen H Ngo
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The present invention relates to management of mobility of a terminal in a wireless communication system, and an operating method of the terminal comprises: a step of transmitting a first message requesting mobility-related capability information of an access network, and a step of receiving a second message informing of the mobility-related capability information of the access network. In addition, the present invention includes other embodiments in addition to the aforementioned embodiment.

16 Claims, 28 Drawing Sheets

(51) Int. Cl.
*H04W 8/08* (2009.01)
*H04L 29/12* (2006.01)
*H04W 88/16* (2009.01)
*H04W 80/04* (2009.01)
*H04W 36/12* (2009.01)

(52) U.S. Cl.
CPC ...... *H04L 61/2007* (2013.01); *H04L 61/6068* (2013.01); *H04W 36/125* (2018.08); *H04W 80/04* (2013.01); *H04W 88/16* (2013.01)

(56) References Cited

U.S. PATENT DOCUMENTS

| | | | | |
|---|---|---|---|---|
| 9,730,101 B2* | 8/2017 | Zhang | | H04W 4/027 |
| 2002/0032855 A1* | 3/2002 | Neves | | H04L 29/12009 |
| | | | | 713/154 |
| 2003/0007475 A1* | 1/2003 | Tsuda | | H04L 29/06027 |
| | | | | 370/338 |
| 2005/0223114 A1* | 10/2005 | Hanson | | H04L 41/0893 |
| | | | | 709/245 |
| 2007/0047585 A1* | 3/2007 | Gillespie | | H04L 29/06 |
| | | | | 370/475 |
| 2008/0159228 A1* | 7/2008 | Kufner | | H04W 36/0016 |
| | | | | 370/331 |
| 2009/0034494 A1* | 2/2009 | Binet | | H04L 29/06027 |
| | | | | 370/338 |
| 2010/0064038 A1* | 3/2010 | Hu | | H04W 36/0055 |
| | | | | 709/223 |
| 2010/0202403 A1* | 8/2010 | Premec | | H04W 8/08 |
| | | | | 370/331 |
| 2011/0280215 A1* | 11/2011 | Nakagawa | | H04W 36/14 |
| | | | | 370/331 |
| 2012/0127926 A1 | 5/2012 | Drevon et al. | | |
| 2012/0144062 A1 | 6/2012 | Livet et al. | | |
| 2012/0190371 A1* | 7/2012 | Wu | | H04W 36/0011 |
| | | | | 455/437 |
| 2012/0282931 A1 | 11/2012 | Giustina et al. | | |
| 2013/0070739 A1* | 3/2013 | McCann | | H04W 48/16 |
| | | | | 370/338 |
| 2013/0100894 A1* | 4/2013 | Kotecha | | H04W 8/02 |
| | | | | 370/329 |
| 2014/0307629 A1* | 10/2014 | Liebsch | | H04W 36/0011 |
| | | | | 370/328 |
| 2014/0321328 A1* | 10/2014 | Zuniga | | H04W 8/06 |
| | | | | 370/254 |
| 2016/0007191 A1* | 1/2016 | Perras | | H04L 61/1511 |
| | | | | 370/328 |
| 2016/0057681 A1* | 2/2016 | Wang | | H04W 8/02 |
| | | | | 370/331 |

FOREIGN PATENT DOCUMENTS

| | | |
|---|---|---|
| KR | 10-2012-0024823 A | 3/2012 |
| KR | 10-2012-0099687 A | 9/2012 |
| WO | 2013/082245 A1 | 6/2013 |

* cited by examiner

APPARATUS AND METHOD FOR MANAGING MOBILITY IN WIRELESS COMMUNICATION SYSTEM

TECHNICAL FIELD

The present invention relates to mobility management in a wireless communication system.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a wireless communication system such as described above, mobile User Equipments (UEs) such as mobile phones, tablets, laptops, and the like may change a Point of Attachment (PoA) for a network. Whenever the UE changes its PoA, an internet protocol (IP) subnet to which the UE attaches may be changed. The change in the IP subnet may cause a change in an IP address of the UE.

When the IP address is changed while the UE has a data flow with a remote end, a session may be interrupted by the change. For example, when the data flow uses a transmission control protocol (TCP) connection, the TCP connection should be broken and a new TCP connection should be established. When the data flow uses a user datagram protocol (UDP) connection, the UDP connection may be maintained until the remote end is notified of the change in the IP address of the UE.

Various technologies for preventing disruption of an on-going data flow, which may be generated to the UE changing the IP address due to mobility, have been suggested. For example, various schemes such as a client mobile IP, a proxy mobile IP, a general packet radio service tunneling protocol (GTP), a mobility and multi-homing protocol (MOBIKE), a multipath TCP (MPTCP), a stream control transmission protocol (SCTP), a locator/identifier separation protocol (LISP), a host identity protocol (HIP), an session initiation protocol (SIP), and the like have been suggested for the purpose of handling UE mobility or for additional purposes besides the main purpose. Further, some applications such as instant messengers may also manage the UE mobility.

One of differences between the aforementioned schemes is a networking layer. FIG. 1 illustrates an example of mobility management schemes divided according to a hierarchical structure. Referring to FIG. 1, a client mobile IP 164 and a MOBIKE 166 operate on an IP layer 138, that is, layer-3 (L3). An LISP, a proxy mobile IP, and a GTP 170 may be classified to have an operation that is executed on a sub-IP layer which is invisible on an IP layer of a UE even though they use IP-based signaling. The invisibility is not shown by the UE since corresponding protocols are terminated on an access network. An MPTCP 158 and an SCTP 160 operate on a transport layer, that is, layer-4 (L4). An SIP 156 operates on a session layer. In-app mobility schemes 152 and 154 operate on an application layer, that is, layer-7 (L7). Higher layer schemes which are higher than or equal to L4 operate in an end-to-end type. In other words, the UE and the communication remote end is directly associated with execution of such schemes.

A plurality of various mobility management schemes operating on different network layers may be supported by one terminal. However, each of the mobility management schemes operates independently regardless of another scheme. Accordingly, it is impossible to obtain advantages of respective schemes at the same time.

DETAILED DESCRIPTION OF THE INVENTION

Technical Problem

An embodiment of the present invention provides an apparatus and a method for managing mobility of a terminal in a wireless communication system.

Another embodiment of the present invention provides an apparatus and a method for efficiently managing mobility in a wireless communication system.

Another embodiment of the present invention provides an apparatus and a method for providing an optimum data path when a handover is performed in a wireless communication system.

Another embodiment of the present invention provides an apparatus and a method for supporting a seamless handover in a wireless communication system.

Another embodiment of the present invention provides an apparatus and a method for acquiring mobility-related capability information of a network in a wireless communication system.

Another embodiment of the present invention provides an apparatus and a method for acquiring mobility-related capability information of a remote end in a wireless communication system.

Technical Solution

An operation method of a terminal in a wireless communication system according to an embodiment of the present invention includes: transmitting a first message for requesting mobility-related capability information of an access network; and receiving a second message informing of the mobility-related capability information of the access network.

An operation method of a network entity in a wireless communication system according to an embodiment of the present invention includes: receiving a first message for requesting mobility-related capability information from a UE; and transmitting a second message informing of the mobility-related capability information to the UE.

terminal apparatus in a wireless communication system according to an embodiment of the present invention includes: a transmitter configured to transmit a first message for requesting mobility-related capability information of an access network; and a receiver configured to receive a second message informing of the mobility-related capability information of the access network.

A network entity apparatus in a wireless communication system according to an embodiment of the present invention includes: a receiver configured to receive a first message for requesting mobility-related capability information from a UE; and a transmitter configured to transmit a second message informing of the mobility-related capability information to the UE.

EFFECTS OF THE INVENTION

When a handover in which an Internet Protocol (IP) address is changed is performed in a wireless communication system, it is possible to minimize a transmission delay due to the handover while providing an optimum data path.

MODE FOR CARRYING OUT THE INVENTION

Figure 1:
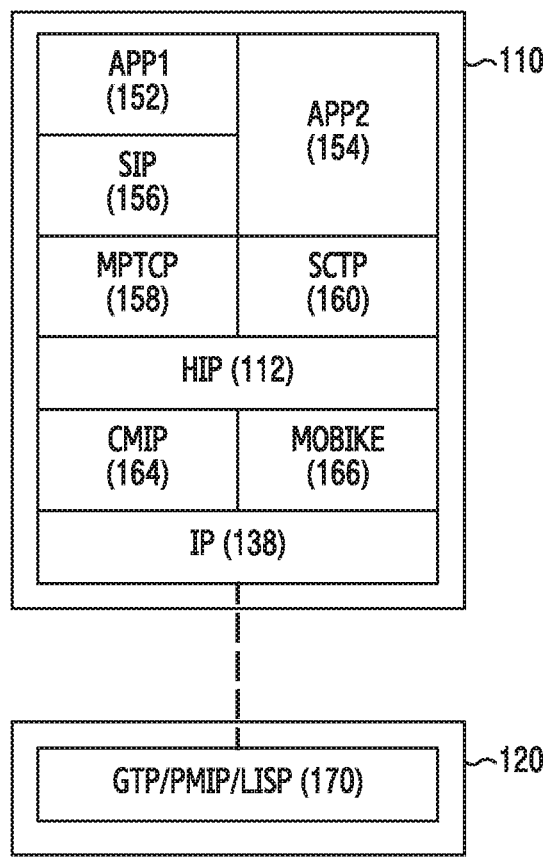
FIG. 1 illustrates an example of mobility management schemes divided according to a hierarchical structure in a wireless communication system.

Hereinafter, the operational principle of the present invention will be described in detail with reference to the accompanying drawings. In describing the present invention below, a detailed description of related known configurations or functions incorporated herein will be omitted when it is determined that the detailed description thereof may unnecessarily obscure the subject matter of the present invention. The terms which will be described below are terms defined in consideration of the functions in the present invention, and may be different according to users, intentions of the users, or customs. Therefore, the definitions of the terms should be made based on the contents throughout the specification.

The present invention describes a technology for managing mobility in a wireless communication system.

The term referring to components of a device used in the following description, the term referring to network entities, and the term referring to a connection state are employed for convenience of description. Therefore, the present invention may not be limited by the terminologies provided below, and other terms that indicate subjects having equivalent technical meanings may be used.

For example, a terminal may be referred to as a user equipment (UE), an mobile station (MS), a user terminal (UT), or the like. In the present invention, a terminal performing D2D communication may be a portable electronic device, and may be one of a smart phone, a portable terminal, a mobile phone, a mobile pad, a media player, a tablet computer, a handheld computer, and a Personal Digital Assistant (PDA). Further, the electronic device may be a device having a function, which is generated by combining two or more functions of the above described devices.

For convenience of description, the present invention uses terms and names defined in a 3rd Generation Partnership Project Long Term Evolution (3GPP LTE). However, the present invention is not limited to the terms and names and may be equally applied to a system according to another standard.

As described above, the mobility management schemes such as a client mobile IP, a proxy mobile IP, a general packet radio service tunneling protocol (GTP), a mobility and multi-homing protocol (MOBIKE), a multipath TCP (MPTCP), a stream control transmission protocol (SCTP), a locator/identifier separation protocol (LISP), a host identity protocol (HIP), a session initiation protocol (SIP), and the like haven been known, and some applications may include a function for mobility management therein. When an IP address of the terminal is changed, the application having the mobility management function may notify a communication peer of a new IP address.

In a networking layer on which the schemes are performed, the client mobile IP and the MOBIKE operate on an IP layer, that is, layer-3 (L3). The LISA, the proxy mobile IP, and the GTP operate on a sub-IP layer. The MPTCP and the SCTP operate on a transport layer, that is, layer-4 (L4). The SIP operates on a session layer. The in-app mobility scheme operates on an application layer, that is, layer-7 (L7). For convenience of description, layers higher than or equal to L4 are referred to as "higher-layers".

Layer-specific mobility management schemes have the following advantages and disadvantages.

In general, the mobility management schemes performed in the sub-IP can be used in all of the $3^{rd}$ generation (3G) network and the $4^{th}$ generation (4G) network. For convenience of description, the mobility management scheme performed in the sub-IP is referred to as a "sub-IP scheme". When the sub-IP scheme is performed, the terminal is not required to execute anything and most operations are performed by the network. Since the sub-IP schemes are performed on layers equal to or lower than the IP, all applications executed in the terminal may receive benefits from them. Further, the sub-IP schemes may provide a seamless handover. The seamless handover is one type of IP handover procedures that minimize stop of on-going data flows (for example, packet loss and delay). The seamless handover can be performed when the procedure is completed by signaling between neighboring network elements such as a previous access gateway and a new access gateway. Disadvantages of the sub-IP schemes are controlling an IP packet to be traversed to a dedicated network element such as a packet data network gateway (PGW) or a home agent (HA) within a core network. Such a detour, that is, a triangular route becomes the cause of additional latency of end to end transmission.

Mobility management schemes performed on the IP layer can be used by some terminal stacks but not all the terminals support the mobility management schemes performed on the IP layer. For convenience of description, the mobility management scheme performed on the IP layer is referred to as an "IP layer scheme". When the IP layer scheme is supported, all applications executed in the terminal may receive benefits from services thereof. When the IP layer scheme is performed, the seamless handover can be made. However, similar to the sub-IP scheme, the IP layer schemes may cause the triangular route.

Mobility management schemes performed on the higher layer can be used by some terminal stacks but not all the terminals support the mobility management schemes performed on the higher layer. For convenience of description, the mobility management scheme performed on the higher layer is referred to as a "higher layer scheme". Since the higher layer schemes are applied to a subset of applications, the higher layer schemes may be supported by some applications. For example, the SCTP gives benefits only to an application using the SCTP. Applications using the TCP cannot receive benefits by the SCTP. Further, the higher layer schemes are performed based on end to end, so that the seamless handover cannot be provided. A handover with a change in an IP address requires end to end signaling between the terminal and the remote end. The handover procedure cannot be completed within a short time due to a transmission delay generated by the signaling. However, the higher layer schemes may generate a direct data path between end points. Accordingly, the triangular route may not be generated and, as a result, an unnecessary transmission delay may not be generated on a data path by the mobility management scheme.

Figure 2:
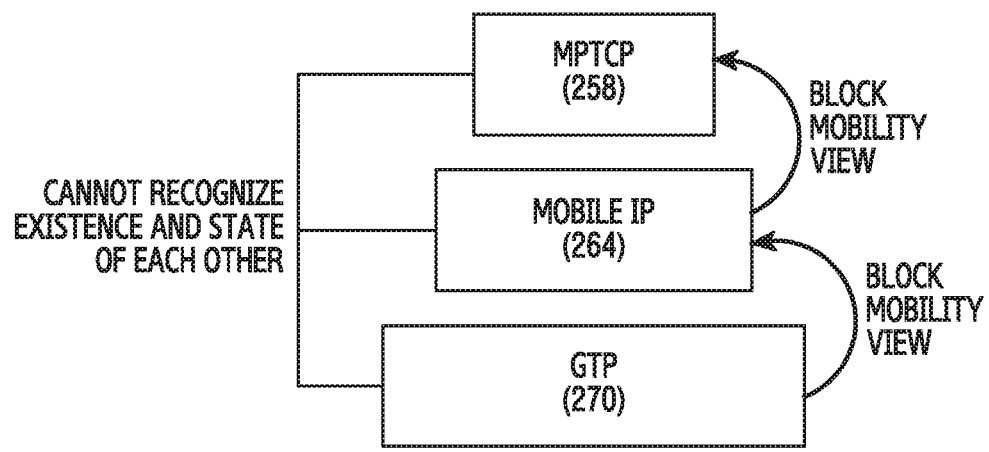
FIG. 2 illustrates an example of an influence between mobility management schemes in a wireless communication system.

At least one of the aforementioned mobility management schemes may be supported by one terminal. However, each mobility management scheme operates independently regardless of another scheme. At this time, an unintended interaction exists between the IP/sub-IP layer scheme and the higher layer scheme as illustrated in FIG. 2 below. FIG. 2 illustrates an example of an influence between mobility management schemes in a wireless communication system. As illustrated in FIG. 2, when the IP layer scheme or the sub-IP scheme is used, the higher layer scheme cannot recognize mobility events. For example, a GTP 270 is used, the GTP 270 blocks mobility view of a mobile IP 264. It is because the terminal maintains a fixed home address when the GTP 270 is used. Further, the mobile IP 264 is used, the mobile IP 264 blocks mobility view of an MPTCP 258. Accordingly, the MPTCP 258 recognizes that access to the same IP subnet still exists. That is, even though the IP subnet of the terminal is changed, the higher layer scheme may recognize the change in the IP address through the IP/sub-IP scheme. Therefore, when the IP or the sub-IP layer scheme is adopted, the higher layer scheme may not be performed.

Figure 3:
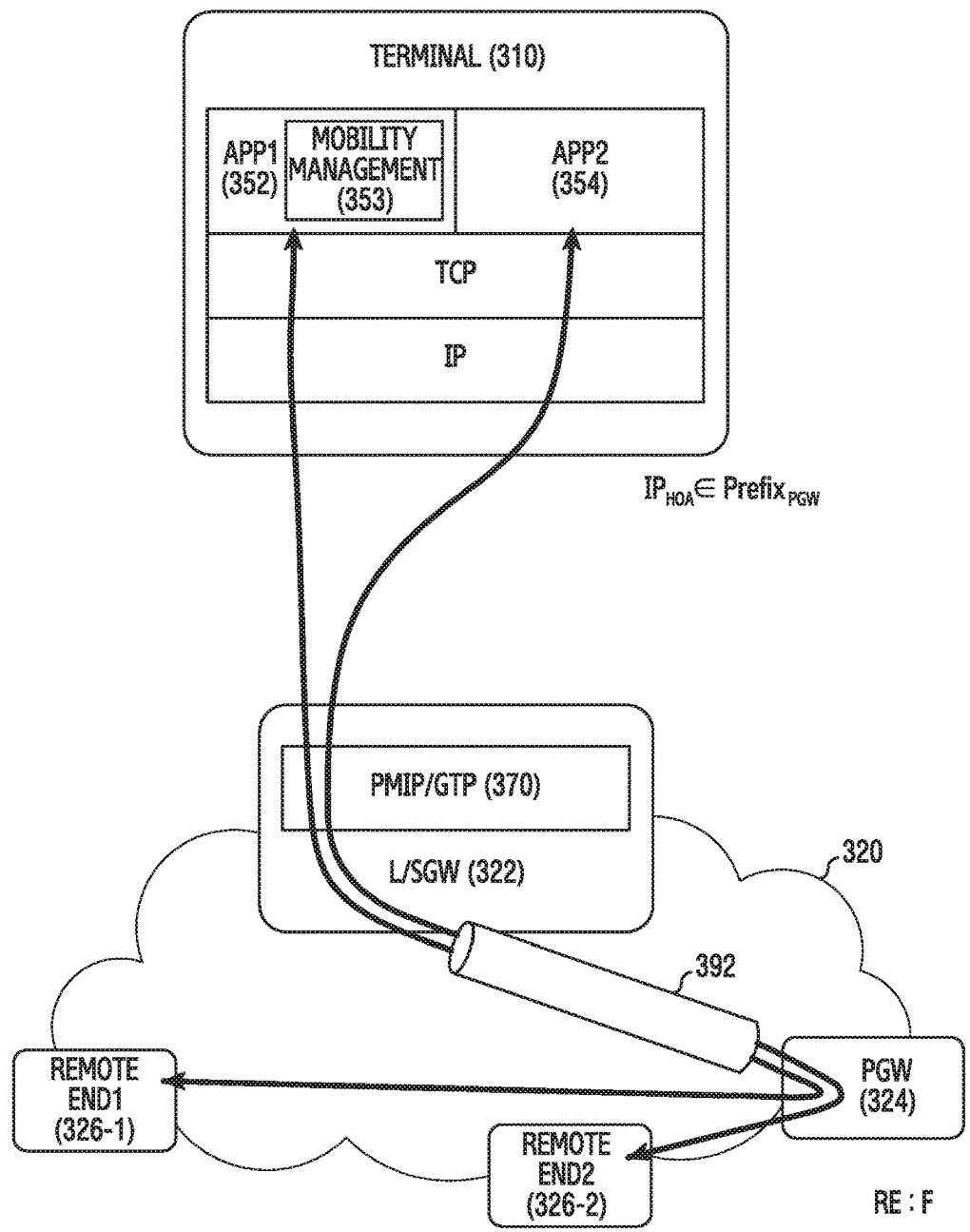
FIG. 3 illustrates an example in which a detour is generated in a wireless communication system.

For example, when both the IP layer/sub-IP layer scheme and the higher layer scheme are supported, a detour may be generated as illustrated in FIG. 3. FIG. 3 illustrates an example in which the detour is generated in a wireless communication system. Referring to FIG. 3, a terminal 310 includes, that is, is executing a first application 352 having a Mobility Management (MM) function 353 and a second application 354 having no mobility management function 353. The first application 352 communicates with remote end #1 326-1, and the second application 354 communicates with remote end #2 326-2. A network 320 includes a local/serving gateway (L/SGW) 322 and a packet data network gateway (PGW) 324. Since a PMIP/GTP 370 is supported in the network 320, the PMIP/GTP 370 is executed. Accordingly, the mobility management function 353 included in the first application 352 of the terminal 310, that is, the in-app mobility management scheme is not executed. In other words, a mobility event is blocked by the sub-IP scheme (for example, the PMIP/GTP 370), so that the in-app mobility management scheme is not performed. Accordingly, even though the first application 352 has the higher layer scheme, the first application 352 performs communication through a detour including a tunnel 392 generated by the PMIP/GTP 370 rather than a shorter path. To this end, a used IP address IPHoA includes a prefix PrefixPGW corresponding to the PGW 324.

Figure 4:
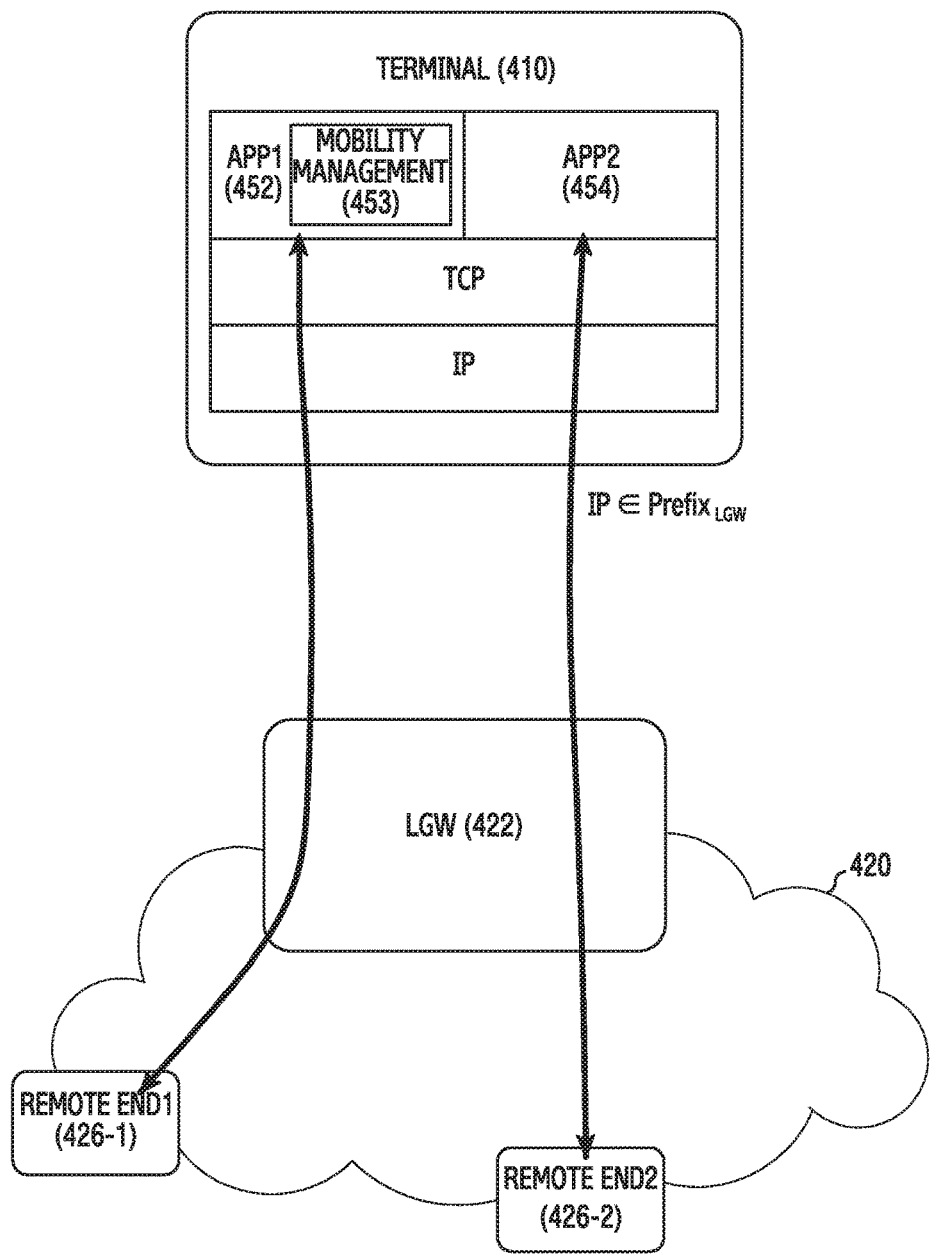
FIG. 4 illustrates an example in which a handover delay is generated in a wireless communication system.

In another example, when only the higher layer scheme is supported, a handover delay may be generated as illustrated in FIG. 4 below. FIG. 4 illustrates an example in which the handover delay is generated in a wireless communication system. Referring to FIG. 4, a terminal 410 includes, that is, is executing a first application 452 having a mobility management function 453 and a second application 454 having no mobility management function 453. The first application 452 communicates with remote end #1 426-1, and the second application 454 communicates with remote end #2 426-2. A network 420 includes a local gateway (LGW) 422. The LGW 422 corresponds to a serving gateway of the terminal 410. Since the sub-IP scheme is not supported in the network 420, the mobility management function 453 of the first application 452, that is, the in-app mobility management scheme is executed. Accordingly, an IP address changed by end to end signaling may be transferred to remote end #1 426-1 and remote end #2 426-2, and communication may be performed through a path shorter than that of FIG. 3. To this end, a used IP address IPHoA includes a prefix PrefixPG corresponding to the LGW 422. However, due to the end to end signaling, a round-trip time may increase and, accordingly, a handover delay may be generated. Further, in a process of re-configuring a connection due to a change in the IP address, a packet loss may be generated.

As described above, each mobility management scheme may have an advantage and a disadvantage. A single scheme capable of simultaneously providing the seamless handover and a most direct data-path does not exist. Accordingly, the present invention proposes various embodiments for achieving the seamless handover and the direct data-path through coordinated execution of available mobility schemes.

FIGS. 5A to 5F illustrate examples of mobility management in a wireless communication system according to an embodiment of the present invention.

Figure 5A:
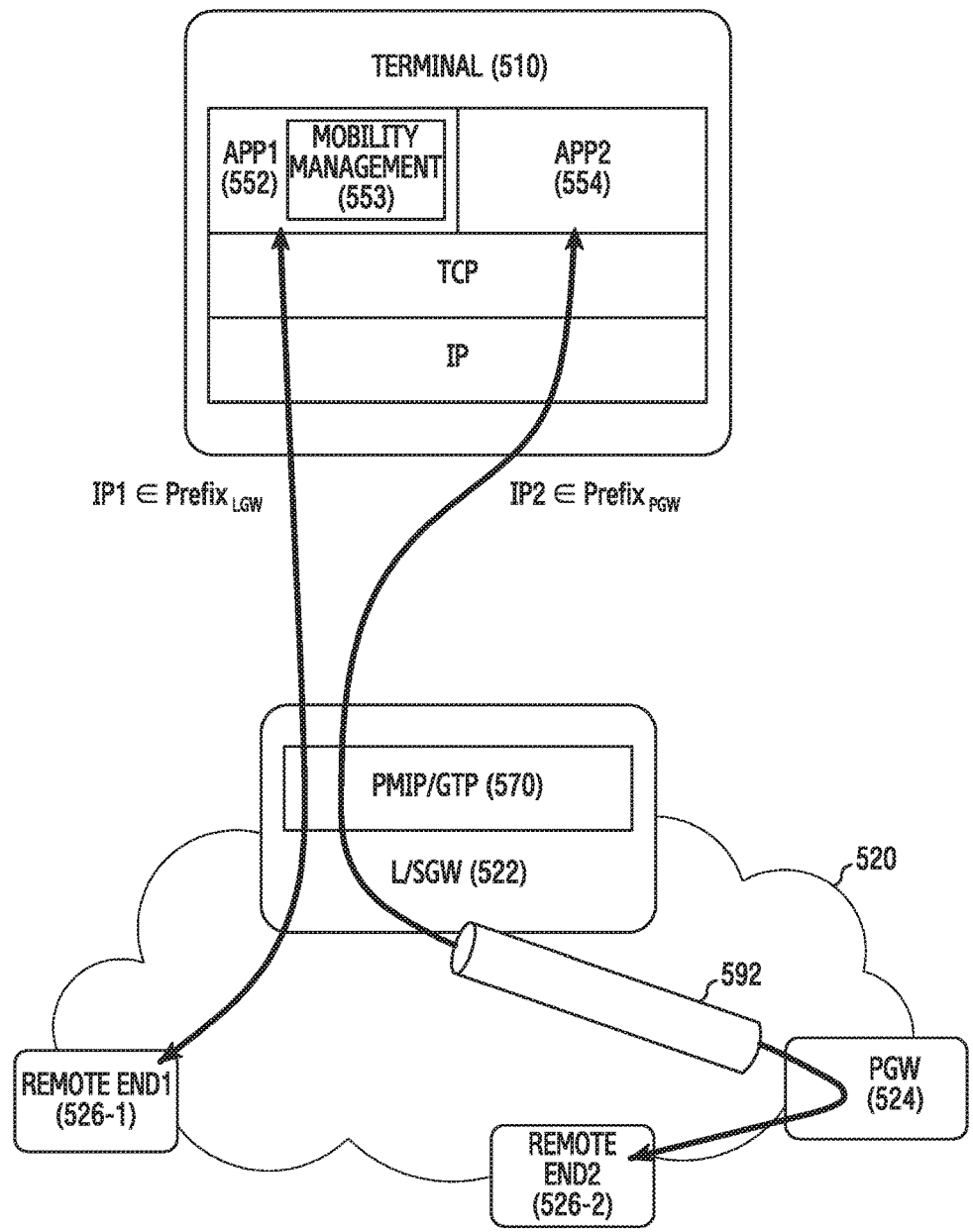
FIGS. 5A to 5F illustrate examples of mobility management in a wireless communication system according to an embodiment of the present invention.

Referring to FIG. 5A, a terminal 510 includes, that is, is executing a first application 552 having a mobility management function 553 and a second application 554 having no mobility management function 553. The first application 552 communicates with remote end #1 526-1, and the second application 554 communicates with remote end #2 526-2. A network 520 includes an L/SGW 522 and a PGW 524. The first application 552 uses and IP address IP1, and the second application 554 uses an IP address IP2. Here, using the IP address IP1 means setting a source address within an IP header of a packet transmitted by the terminal 510 as IP1. IP1 is allocated by the L/SGW 522 and includes a prefix PrefixLGW corresponding to the L/SGW 522. Further, IP2 is allocated by the PGW 524 and includes a prefix PrefixPGW corresponding to the PGW 524. That is, the second application 554 uses IP2 anchored by the PGW 524, so that data transmitted and received through the second application 554 is transferred through a tunnel 592.

Figure 5B:
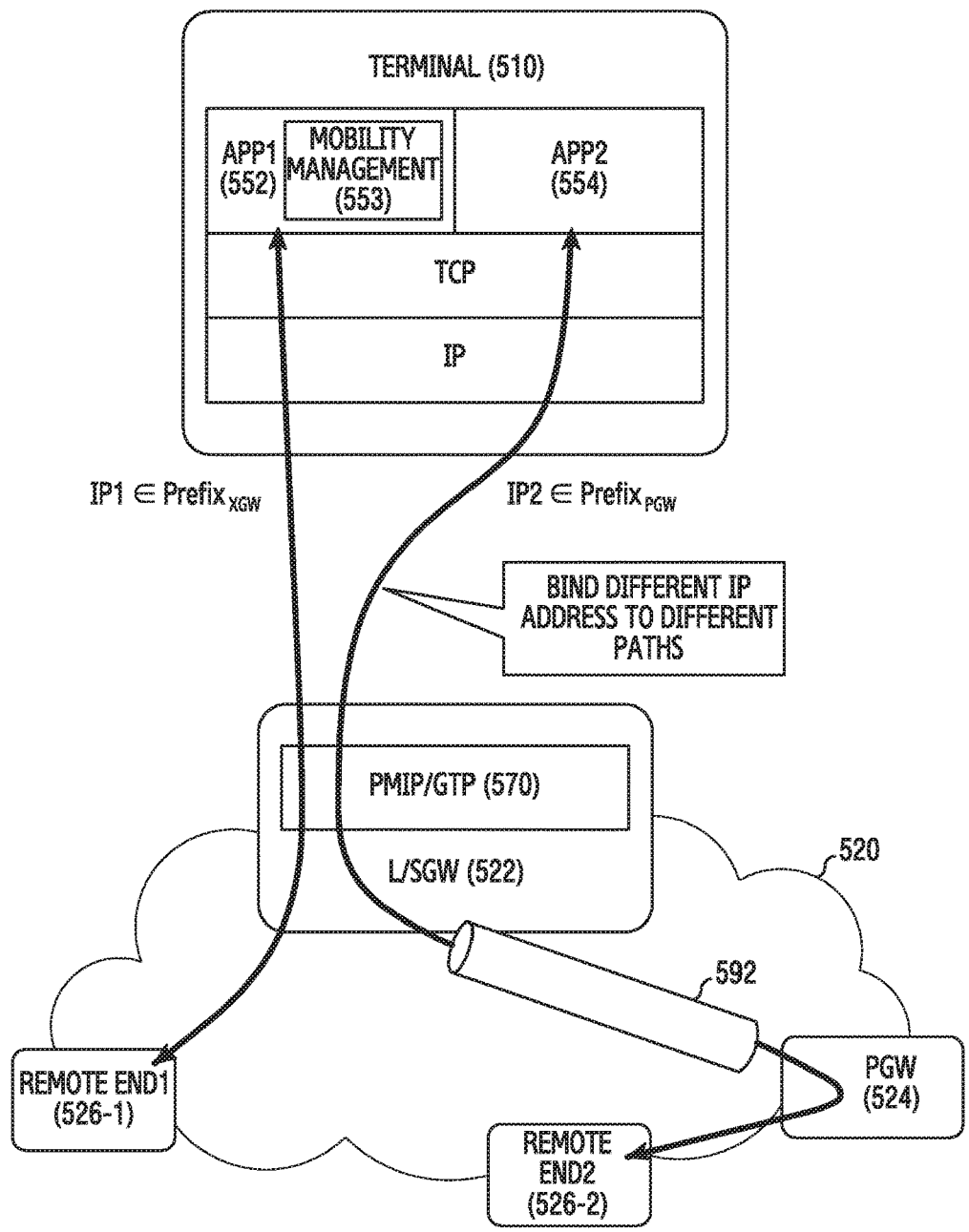

Referring to FIG. 5B, two IP addresses of the terminal 510 may be bound to a different paths (plumbings). A first path corresponding to the first application 552 includes a first application 552-TCP-IP, and a second path corresponding to the second application 554 may include a second application 554-TCP-IP. The second application 554 uses IP2 including a prefix PrefixPGW corresponding to the PGW 524, so that data transmitted and received through the second application 554 is transferred through the L/SGW 522, the tunnel 592, and the PGW 524. In contrast, since the first application 552 uses the IP address IP1 including a prefix PrefixXGW corresponding to a currently accessed gateway, data transmitted and received through the first application 552 is transferred only through the L/SGW 522.

Figure 5C:
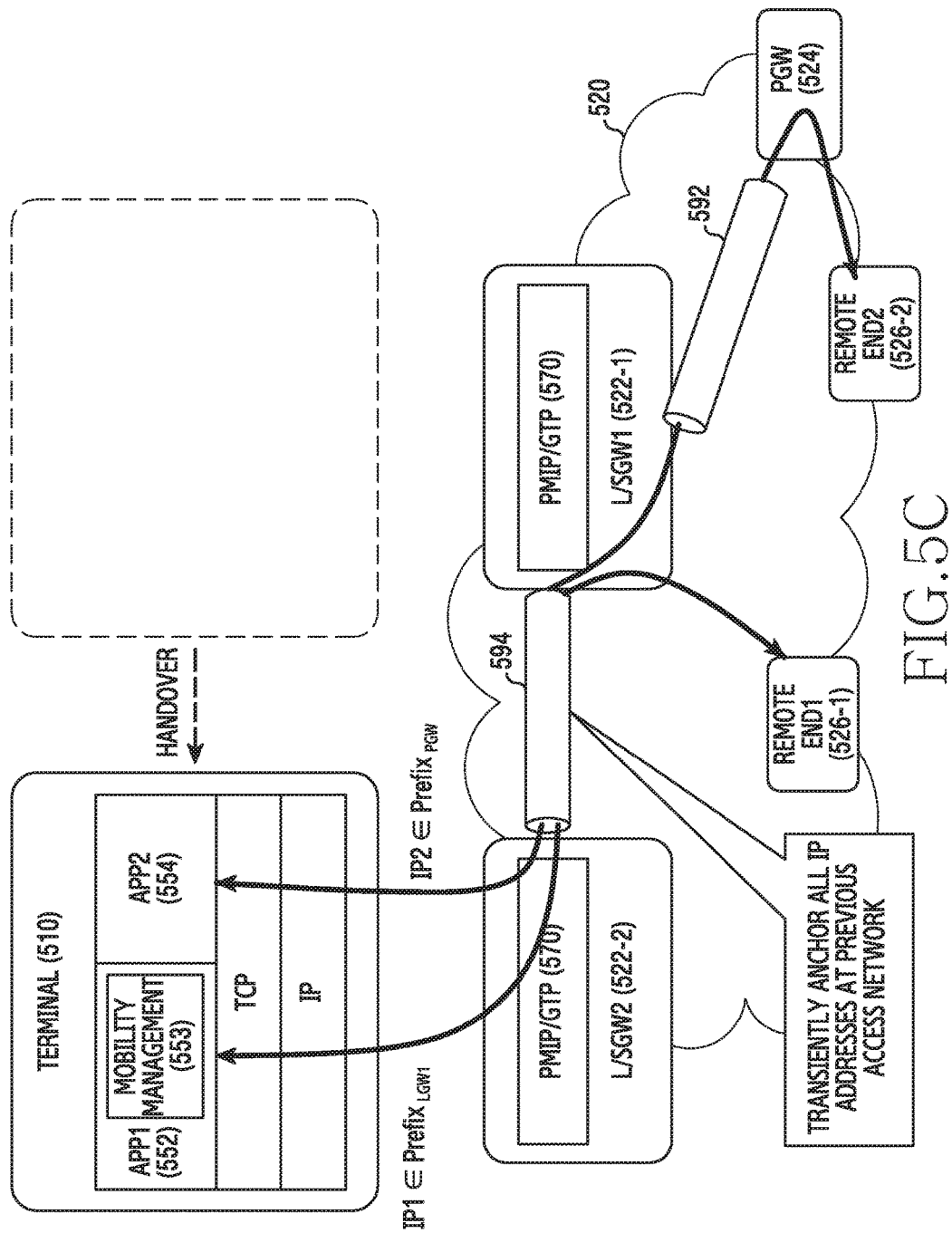

Referring to FIG. 5C, the terminal 510 performs a handover. That is, the terminal 510 changes an IP subnet from L/SGW #1 522-1 to L/SGW#2 522-2 by movement. Since the first application 552 has the mobility management function 553, the first application 552 may directly configure a path through L/SGW #2 522-2 without the tunnel 594. However, according to an embodiment, in order to reduce a transmission delay due to the handover, a data flow of the first application 552 is transiently anchored to L/SGW #1 522-1 which is a previous access network. Accordingly, the network 520 generates the tunnel 594 between L/SGW #2 522-2 and L/SGW #1 522-1 and controls data of the first application 552 to be transferred using the tunnel 594 through L/SGW #1 522-1. That is, L/SGW #2 522-2 notifies L/SGW #1 522-1 that the terminal 510 accesses the IP subnet of L/SGW #2 522-2, L/SGW #1 522-1 transfers a packet from remote end #1 526-1 to the terminal 510 to L/SGW #2 522-2, and L/SGW #2 522-2 transfers a packet from the terminal 510 to remote end #1 526-1 to L/SGW #1 522-1. To this end, the first application 552 uses an IP address including a prefix PrefixLGW1 corresponding to L/SGW #1 522-1. Since the second application 554 does not include the mobility management function 553, the second application 554 performs communication in a state of being still anchored to the PGW 524 by the sub-IP scheme. At this time, the network 520 uses the transiently generated tunnel 594 without generating the tunnel between L/SGW #2 522-2 and the PGW 524. That is, the network 522 transfers data of the second application 554 to the PGW 524 through the tunnel 594 and the tunnel 592. To this end, the second application 554 uses an IP address including a prefix PrefixPGW corresponding to PGW 524.

Figure 5D:
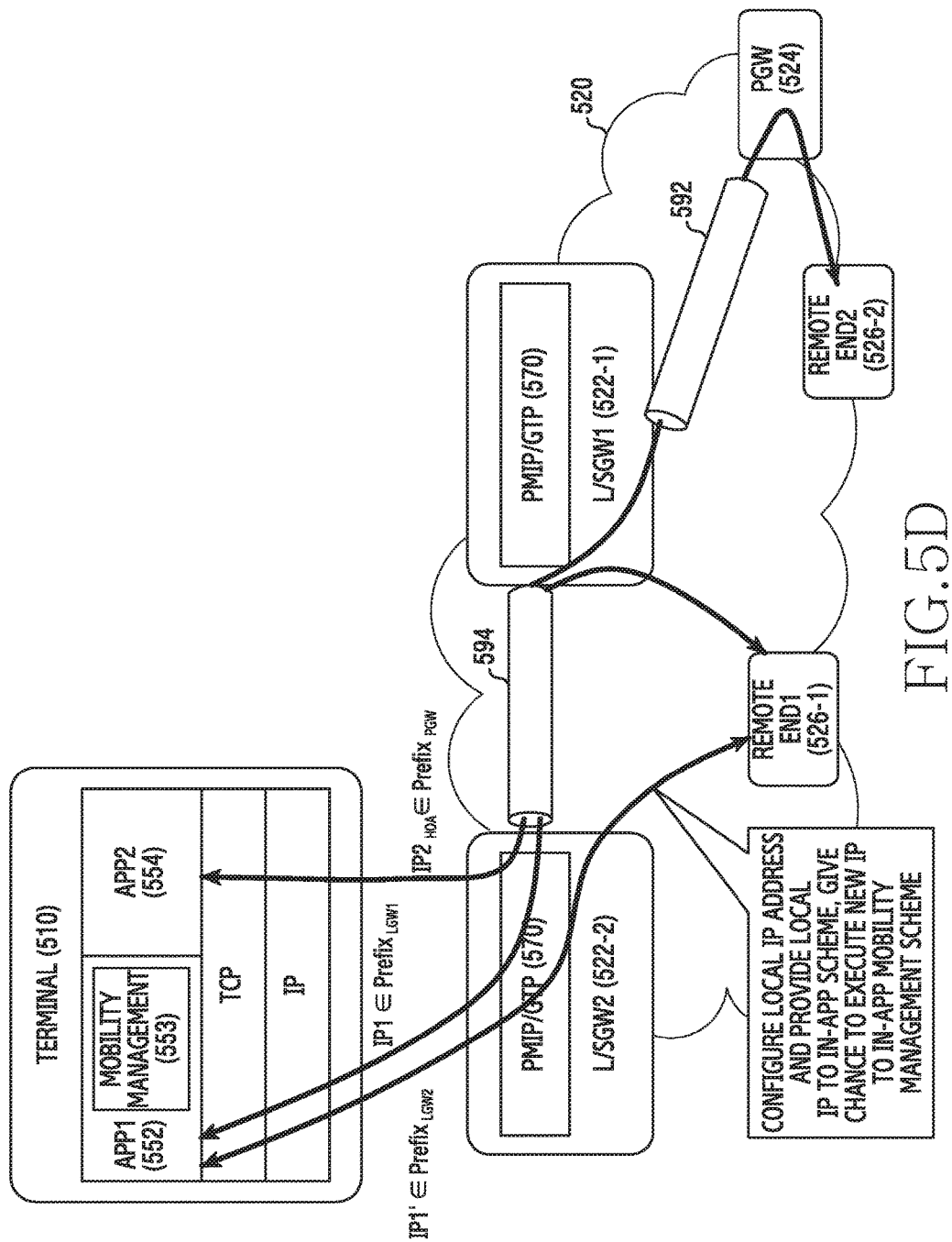

Referring to FIG. 5D, a local IP address IP1' for the first application 552 is configured and provided as the mobility management function 553. When the terminal 510 recognize access to the IP subnet of L/SGW #2 522-2, the terminal 510 requests to allocate a new IP address. As the new IP address, IP1' is allocated. Accordingly, the first application 552 configures a direct path with remote end #1 526-1 through L/SGW #2 522-2. That is, IP1' includes a prefix PrefixLGW2 corresponding to L/SGW #2 522-2. Accordingly, the first application 522 may transiently use two paths including the path using IP1 and the path using IP1'.

Figure 5E:
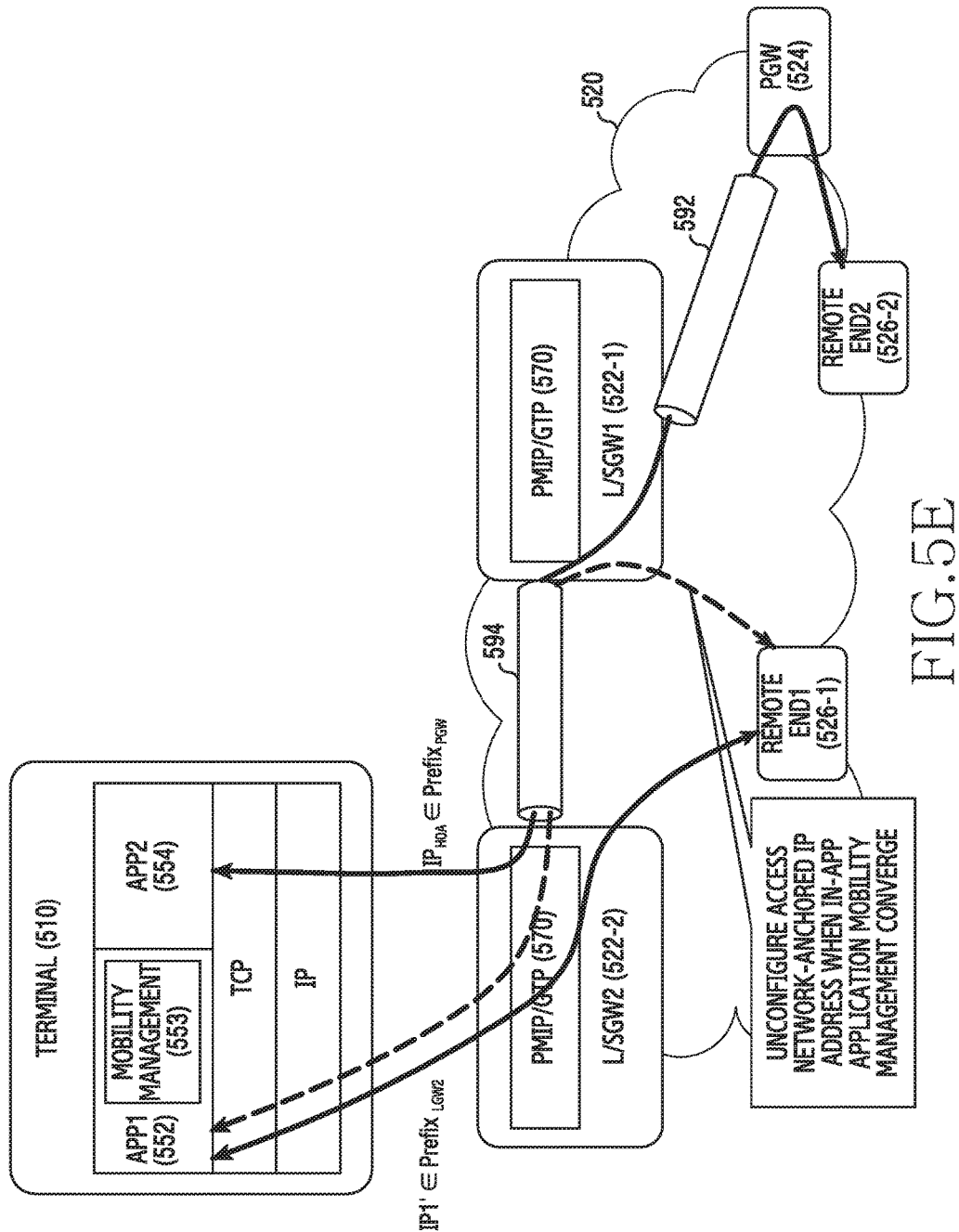

Referring to FIG. 5E, after completely configuring the direct path, the first application 522 re-configures the anchored IP address IP1. That is, the first application 522 releases IP1. In other words, the first application 522 uses only IP1'. To this end, the first application 522 may transmit a message informing of the release of IP1 to L/SGW #1 522-1. Alternatively, as the direct path is completely configured, L/SGW #2 522-2 may transmit the message informing of the release of IP1 to L/SGW #1 522-1. Alternatively, without an explicit message informing of the release of IP1, IP1 may be released as the direct path is completely configured. In this case, L/SGW #2 522-2 may notify the configuration of the direct path, that is, completion of the IP handover to L/SGW #1 522-1.

Figure 5F:
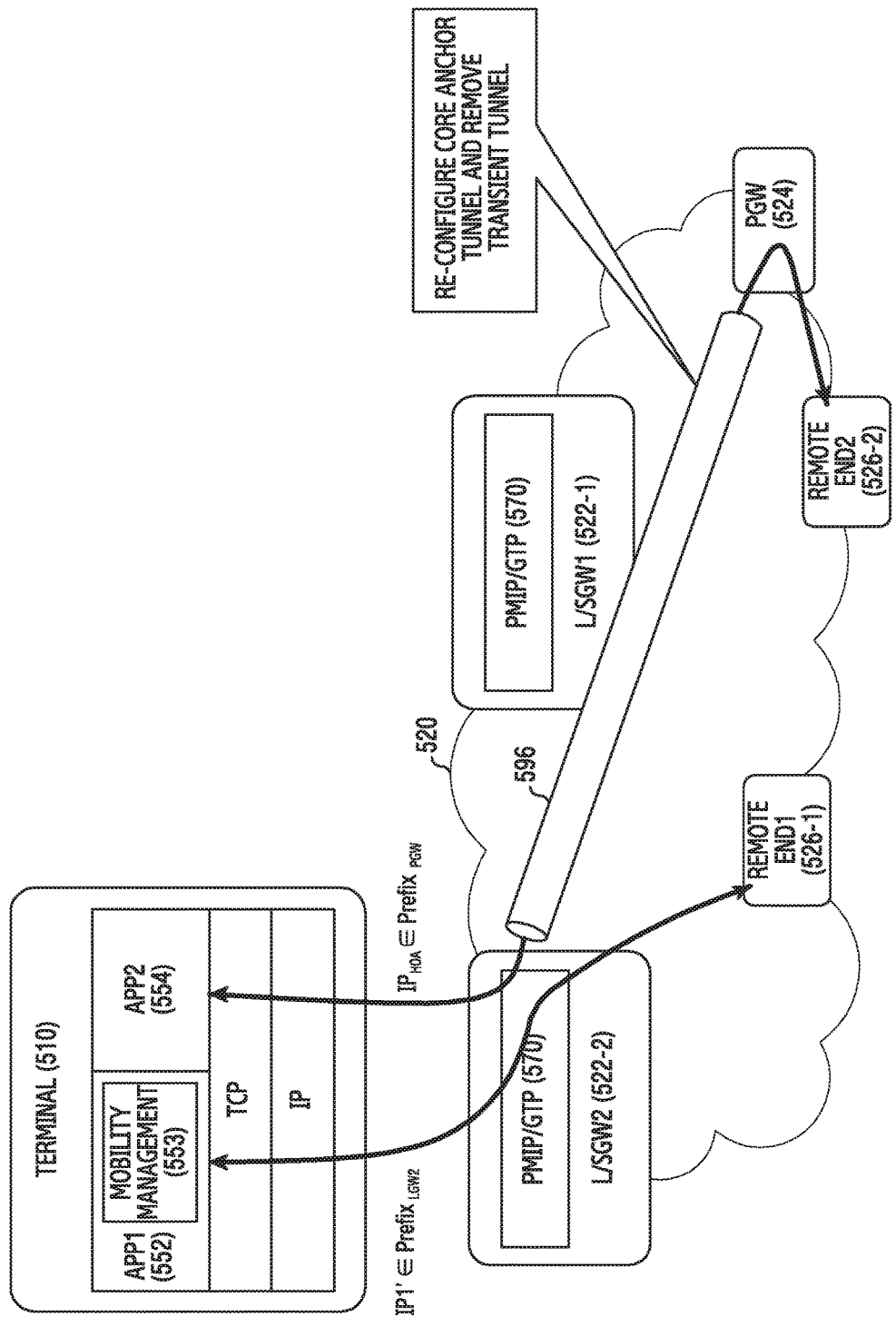

Referring to FIG. 5F, the network 520 re-configures a core anchor tunnel and remove (unplumbing) the transiently generated tunnel 594. That is, as the tunnel 594 is removed, the path through which the data of the second application 554 is transferred to the PGW 524 disappears, a tunnel 596 between L/SGW #2 522-2 and the PGW 524 is generated and the tunnel 592 between L/SGW #1 522-1 and the PGW 524 is removed.

Figure 6:
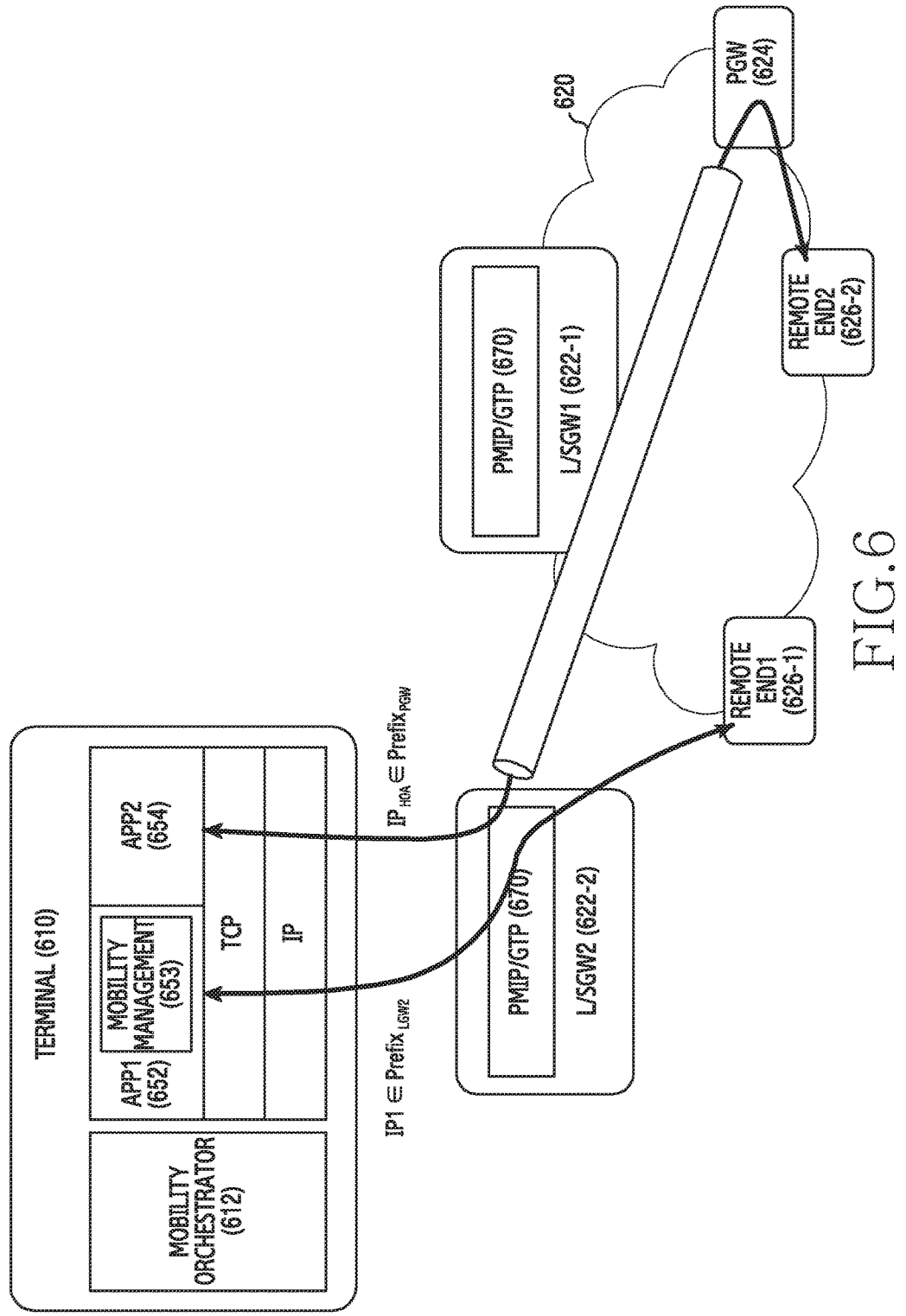
FIG. 6 illustrates a terminal including a mobility orchestrator in a wireless communication system according to an embodiment of the present invention.

In order to perform the procedures illustrated in FIGS. 5A to 5F, the terminal may include elements illustrated in FIG. 6 below. FIG. 6 illustrates a terminal including a mobility orchestrator in a wireless communication system according to an embodiment of the present invention. The mobility orchestrator may be referred to as a "multi-layer mobility controller". Referring to FIG. 6, a terminal 610 includes a first application 652 having a mobility management function 653 and a second application 654 having no mobility management function 653, and further includes a mobility orchestrator 612 according to an embodiment of the present invention.

The mobility orchestrator 612 controls coordinated execution between a plurality of mobility management schemes such that the procedures illustrated in FIGS. 5A to 5F can be performed. Specifically, the mobility orchestrator 612 has a capability for engaging different mobility protocols to be linked to each other. At this time, which mobility protocols, that is, mobility management schemes are linked may be determined according to a mobility-related capability of the terminal 610, a network 620, and remote ends 626-1 and 626-2. Further, the mobility orchestrator 612 may execute different mobility protocols through tight coordination. Accordingly, in the handover, the mobility orchestrator 612 may provide an optimum data path while providing the seamless handover.

Figure 7:
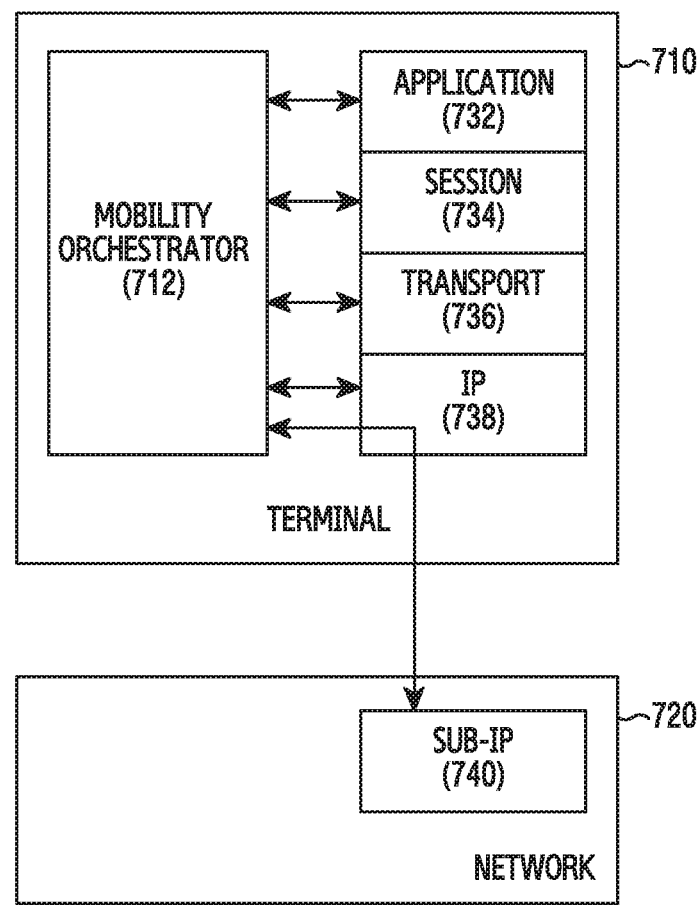
FIG. 7 illustrates an example of a hierarchical structure of a terminal and a network in a wireless communication system according to an embodiment of the present invention.

FIG. 7 illustrates an example of a hierarchical structure of a terminal and a network in a wireless communication system according to an embodiment of the present invention.

Referring to FIG. 7, a terminal 710 includes an application layer 732, a session layer 734, a transport layer 736, and an IP layer 738, and a network 720 includes a sub-IP layer 740. According to an embodiment of the present invention, the terminal 710 includes a mobility orchestrator 712 which is a new functional entity for a mutual interaction between a plurality of layers. The mobility orchestrator 712 determines and executes an optimum combination of the mobility management schemes through an orchestrated way for achieving the seamless handover using a per-flow most direct data-path.

In a concrete example, a function of the mobility orchestrator 712 is described below. The mobility orchestrator 712 may discover capabilities of the terminal 710 and the network 720. That is, the mobility orchestrator 712 discovers which mobility management scheme is provided in the terminal 710 and the network 720. For example, the mobility orchestrator 712 may identify that the terminal 710 supports an MPTCP and the network 720 supports a proxy mobile IP. Further, the mobility orchestrator 712 may discover a capability of a remote end. That is, the orchestrator 712 discovers which mobility management scheme is supported by the remote end. For example, the mobility orchestrator 712 may identify that the remote end supports the MPTCP. The mobility orchestrator 712 may determine an optimum set of the mobility management schemes to be used for a given data flow. More specifically, the mobility orchestrator 712 may determine a primary mobility management scheme and an auxiliary mobility management scheme to be applied to the given data flow. For example, with respect to a particular application, the mobility orchestrator 712 may determine to use an in-app mobility management scheme using a transient proxy mobile IP for the seamless handover. Further, the mobility orchestrator 712 may control coordinated execution of mobility schemes selected for a particular data flow.

Hereinafter, a control procedure of the mobility orchestrator according to an embodiment of the present invention will be described using a detailed example.

Figure 8:
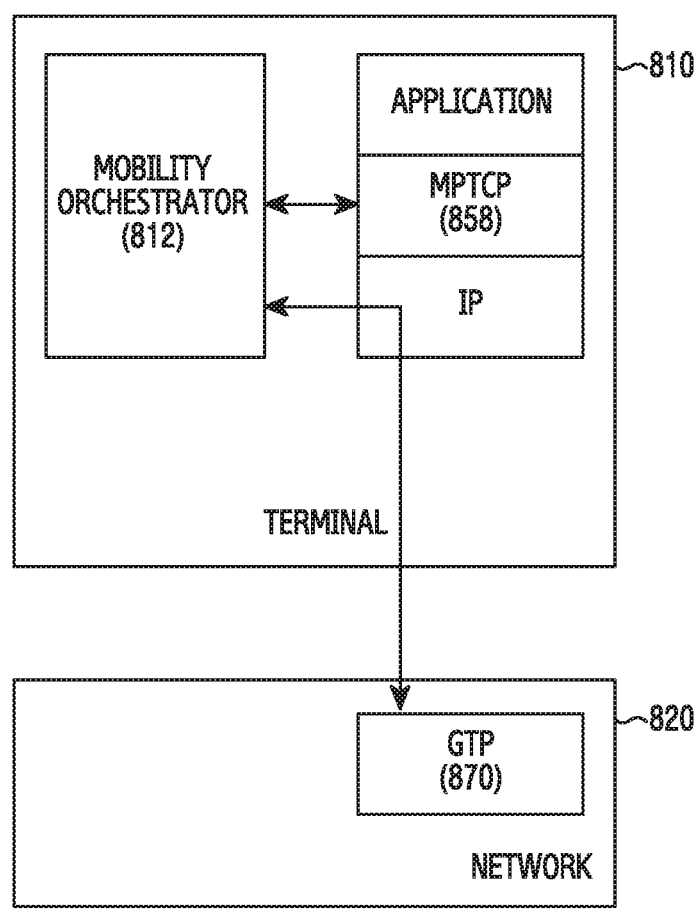
FIG. 8 illustrates an example of a mobility management scheme supported by a terminal and a network in a wireless communication system according to an embodiment of the present invention.

FIG. 8 illustrates an example of a mobility management scheme supported by a terminal and a network in a wireless communication system according to an embodiment of the present invention. Referring to FIG. 8, a terminal 810 supports an MPTCP 858 operating on a transport layer, and a network 820 supports a GTP 870 operating on a sub-IP layer. Accordingly, a mobile orchestrator 812 controls coordinated execution between the MPTCP 858 and the GTP 870.

For example, the mobility orchestrator 812 discovers that the network 820 provides the GTP 870 as the sub-IP scheme and the MPTCP 858 is available for an application executed in the terminal 810. Further, the mobility orchestrator 812 discovers that a remote end of the application supports the MPTCP 858. Since the terminal 810 and the remote end support the MPTCP 858, the mobility orchestrator 812 assigns a primary role for the mobility management to the MPTCP 858 and disables the GTP 870 for the corresponding data flow. However, for the seamless handover of the terminal 810, the mobility orchestrator 812 may transiently enable the GTP 870. The transient enabling of the GTP 870 is illustrated in FIGS. 9A and 9B below.

Figure 9A:
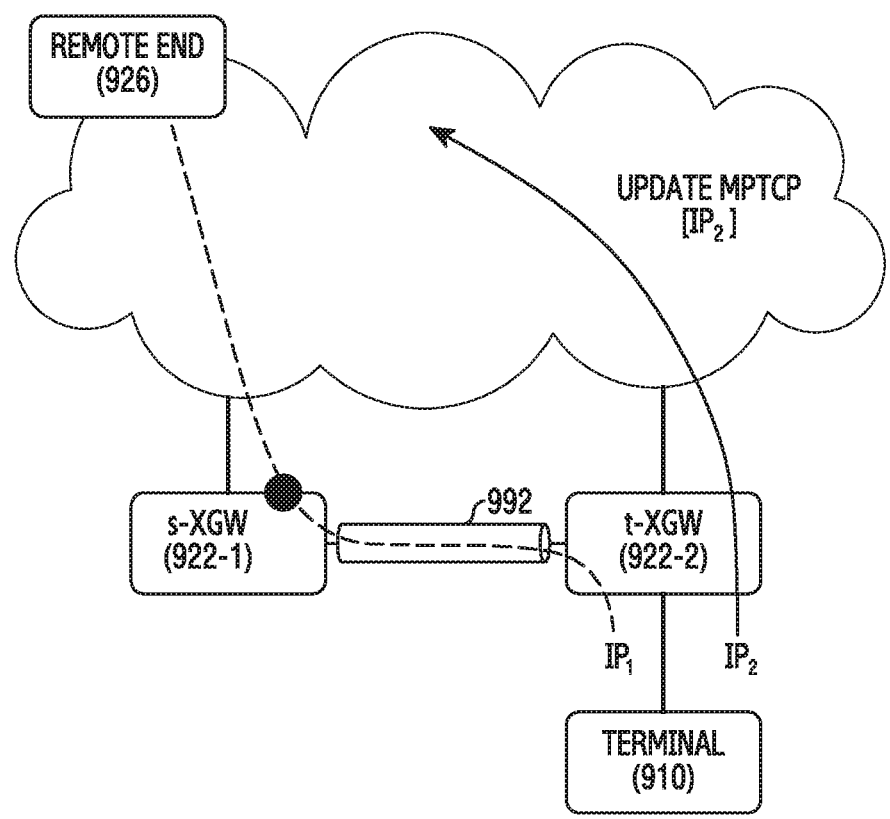
FIGS. 9A and 9B illustrate examples of a state change of a terminal during a handover in a wireless communication system according to an embodiment of the present invention.
Figure 9B:
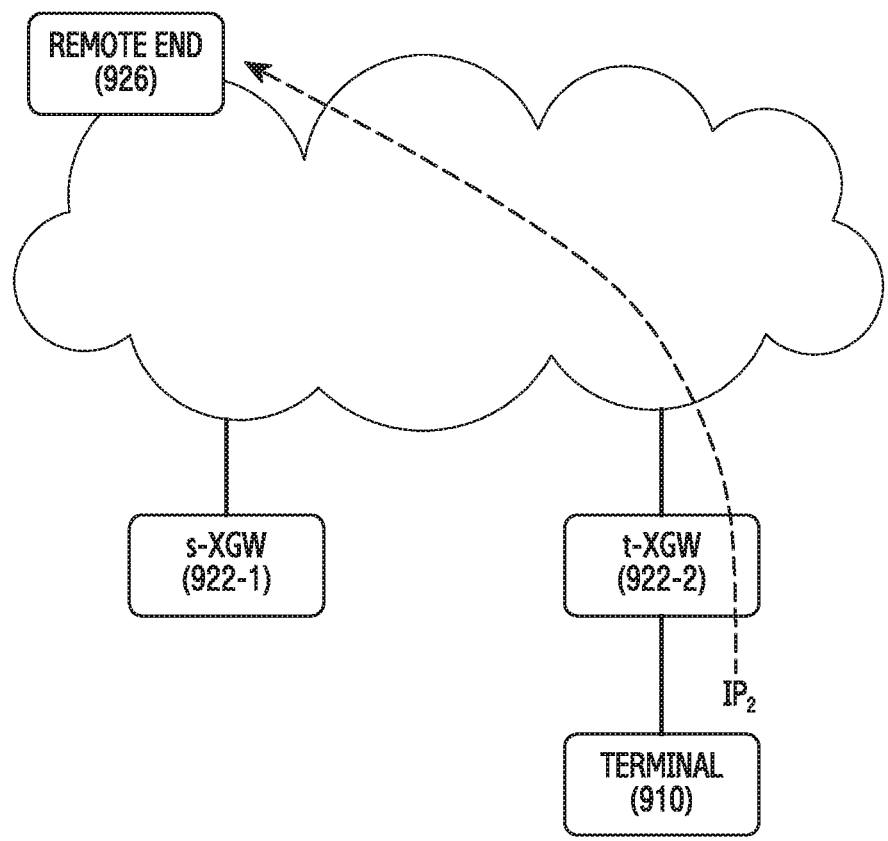

FIGS. 9A and 9B illustrate examples of a state change of a terminal during a handover in a wireless communication system according to an embodiment of the present invention. FIG. 9A illustrates a transition period in which a terminal 910 moves from a source access gateway (s-XGW) 922-1 to a target access gateway (t-XGW) 922-2. Referring to FIG. 9A, after the terminal 910 accesses the target access gateway 922-2, a mobility orchestrator 912 instructs the network to configure an inter-access gateway tunnel 992 such that the terminal 910 can continuously use an IP address IP1 acquired from the serving access gateway. IP1 corresponds to an IP address used for an on-going data flow with a remote end 926. Simultaneously, the mobility orchestrator 912 instructs the network to allocate a new IP address IP2 from the target access gateway 922-2 which is not serviced by the GTP. That is, the IP address IP2 is not anchored to a core network element but is directly anchored to the target access gateway 922-2. The mobility orchestrator 912 notifies a new IP address IP2 of the terminal 910 which is available for the MPTCP such that the MPTCP in the terminal 910 performs an IP handover with a peer at the remote end 926.

Referring to FIG. 9B, after the MPTCP completes the handover, the mobility orchestrator 912 receives a notification of the completion of the handover from the MPTCP. At this time, the mobility orchestrator 912 tears down the tunnel 992 between the source access gateway 922-1 and the target access gateway 922-2 and instructs the network to release IP1. As a result, the terminal 910 maintains IP2 and uses IP2 for communication with the peer through the on-going data flow.

As illustrated in the embodiments of FIGS. 9A and 9B, the seamless handover according to an embodiment of the present invention may be achieved by the transient use of the inter-gateway GTP tunnel 992 while the MPTCP operates as the primary mobility management scheme such that the data flow uses a most direct data path between the terminal 910 and remote end 926.

According to the aforementioned embodiments, the terminal or the mobility orchestrator within the terminal acquires mobility-related capability information of remote ends which are the terminal, the network, and a communication counterpart (correspondent). The mobility orchestrator probes a stack, inspects configuration files in the stack, or has its own configuration files describing which schemes are provided in the same stack, thereby discovering the mobility-related capability of the terminal. The configuration files may be manually or dynamically generated.

In general, some network structures such as 3rd generation partnership project (3GPP) provide default mobility management schemes of the GTP, the proxy mobile IP, and the like. When the network is based on the structure, the mobility orchestrator may premise that the mobility management scheme of the GTP, the prosy mobile IP, and the like is supported. When the mobility-related capability of the network has not been known in advance, the mobility orchestrator may transmit a probe message for explicitly discovering the mobility-related capability of the network. For example, a new DHCP option for performing the discovery through a dynamic host configuration protocol (DHCP) may be defined. For example, the mobility-related capability of the network may be identified as illustrated in FIG. 10 below.

Figure 10:
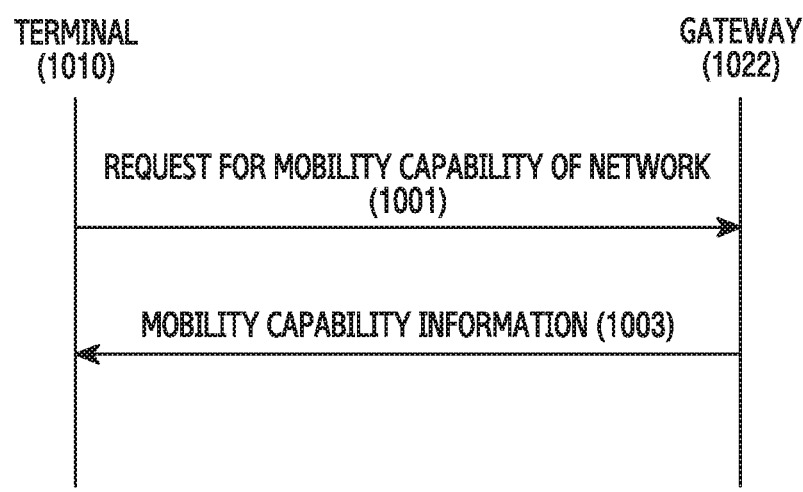
FIG. 10 illustrates a procedure of identifying a mobility-related capability of a network in a wireless communication system according to an embodiment of the present invention.

FIG. 10 illustrates a procedure of identifying a mobility-related capability of a network in a wireless communication system according to an embodiment of the present invention. Referring to FIG. 10, in step 1001, a terminal 1010 transmit a request for mobility capability information of a network to a gateway 1022. For example, the request may be transmitted during an initial access procedure of the terminal 1010. In another example, the request may be transmitted after the terminal 1010 enters the network. In step 1003, the gateway 1022 transmits mobility capability information to the terminal 1010. For example, the mobility capability information may indicate at least one mobility management scheme supported by the network. More specifically, the mobility capability information may indicate proxy mobile IP version 6 (v6), proxy mobile IP version 4 (v4), mobile IP v4 Foreign Agent (FA), and the like.

In order to identify mobility-related information of the remote end, the terminal may use a domain name system (DNS) query. It is assumed that an administrator of the remote end provides additional information on its own host to the DNS. When the DNS does not have any mobility information of the remote end, the terminal may estimate that the remote end does not support anything. For example, the mobility-related capability of the network may be identified as illustrated in FIG. 11 below.

Figure 11:
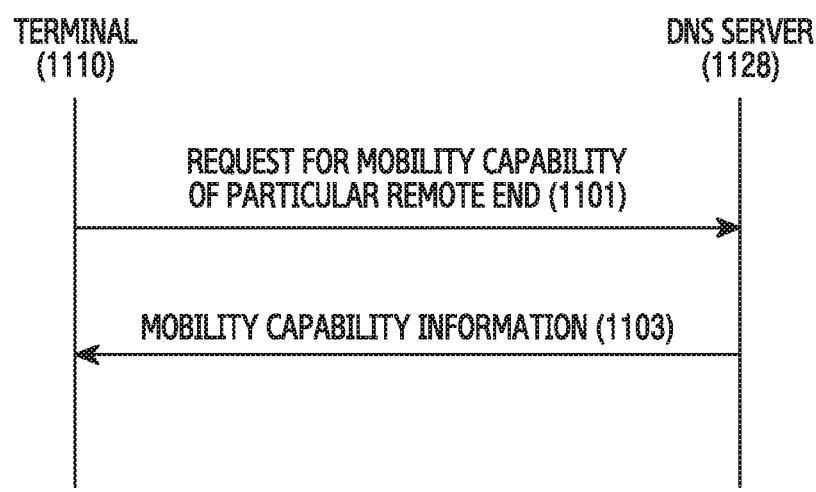
FIG. 11 illustrates a procedure of identifying a mobility-related capability of a remote end in a wireless communication system according to an embodiment of the present invention.

FIG. 11 illustrates a procedure of identifying a mobility-related capability of a remote end in a wireless communication system according to an embodiment of the present invention. Referring to FIG. 11, in step 1101, a terminal 1110 transmits a request for mobility capability information of a particular remote end to a DNS server 1128. In the request, the particular remote end may be identified by a domain name of the particular remote end. For example, the request may be transmitted together with a query of an IP address through the domain name or transmitted separately from the query of the IP address. In step 1103, the DNS server 1128 transmits mobility-related capability information of the particular remote end to the terminal 1110. For example, the mobility capability information may indicate at least one mobility management scheme supported by the network.

Figure 12:
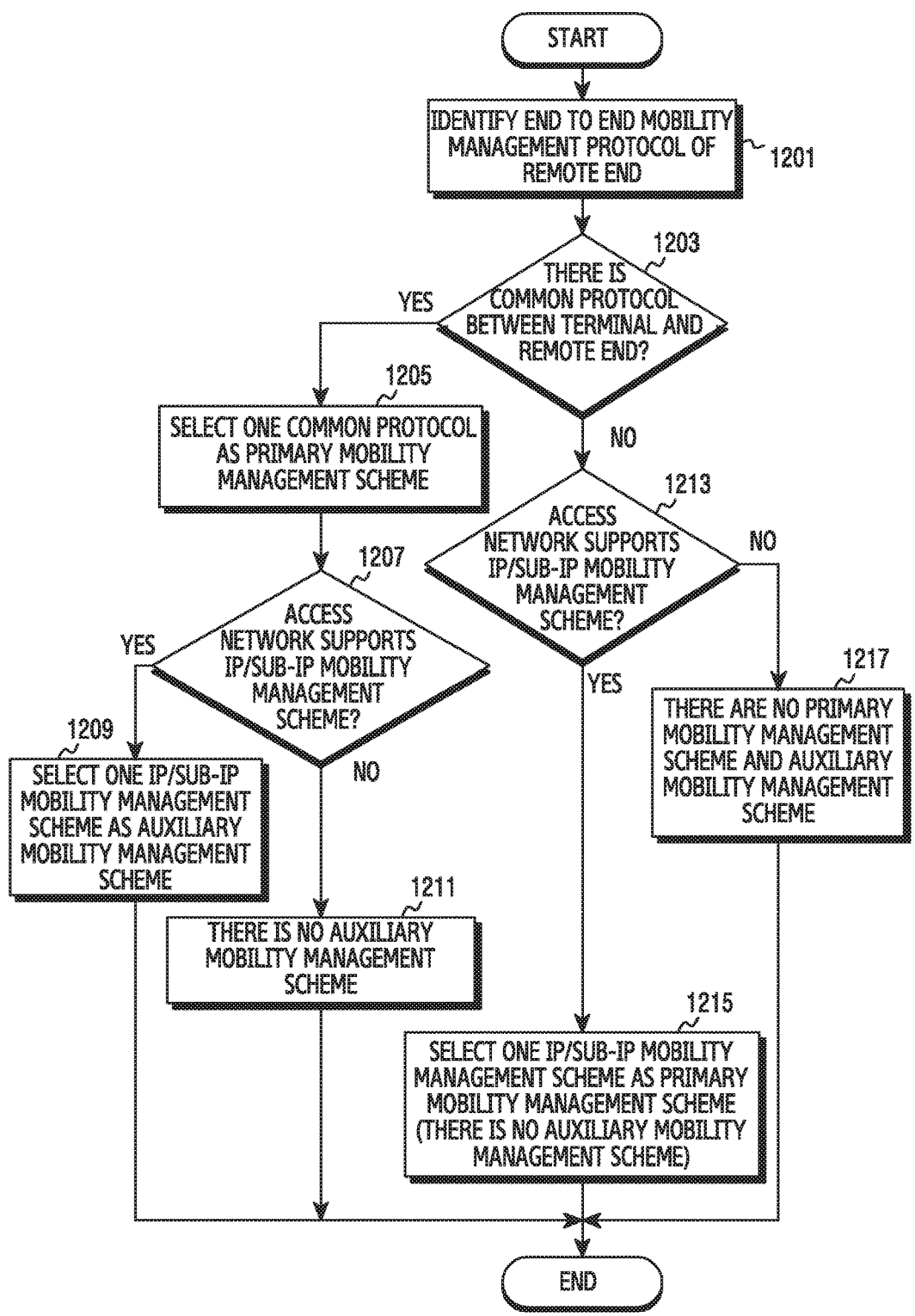
FIG. 12 illustrates a procedure of selecting a mobility management scheme in a wireless communication system according to an embodiment of the present invention.
Figure 13:
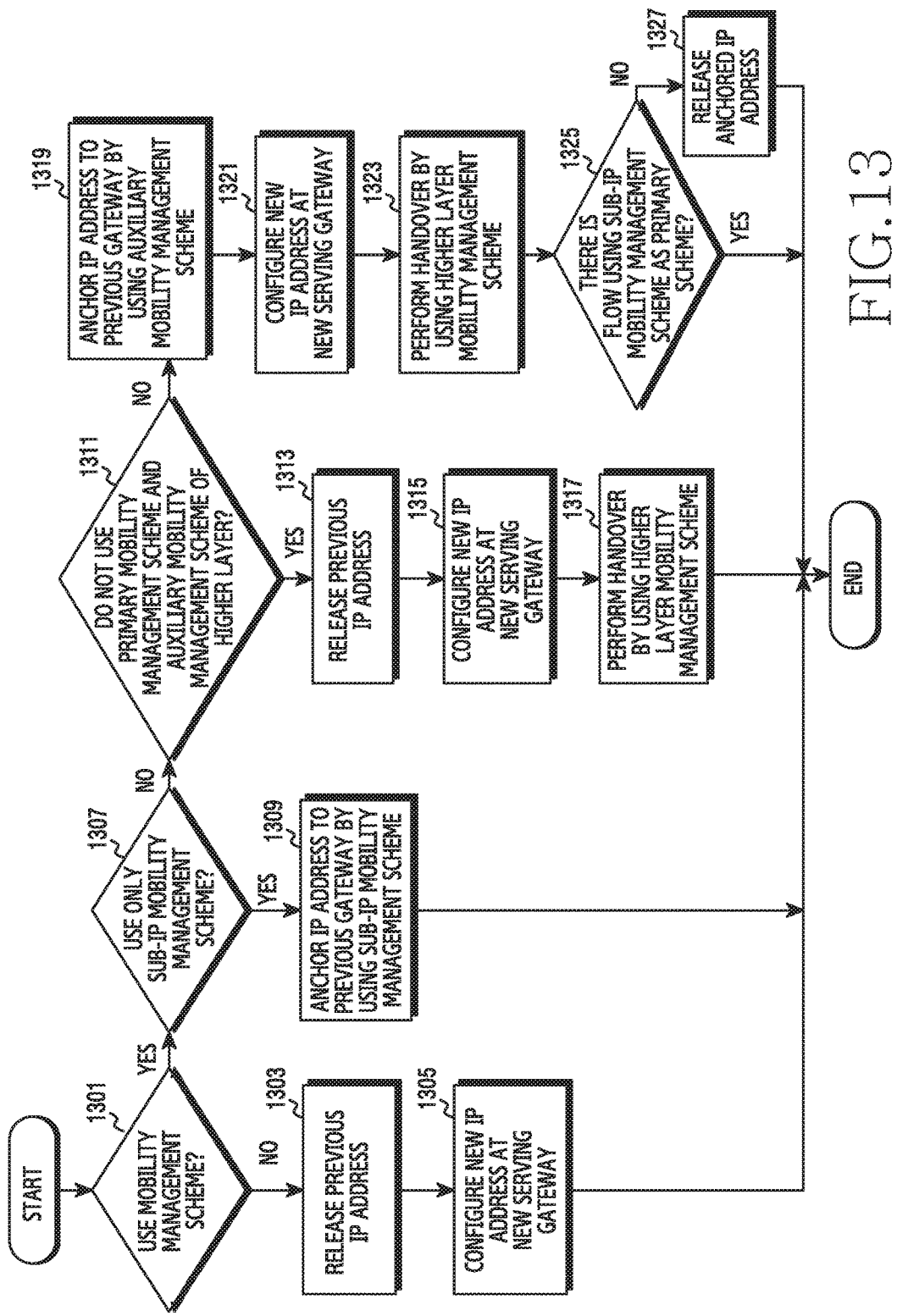
FIG. 13 illustrates a procedure of performing a handover based on a selected mobility management scheme in a wireless communication system according to an embodiment of the present invention.
Figure 14:
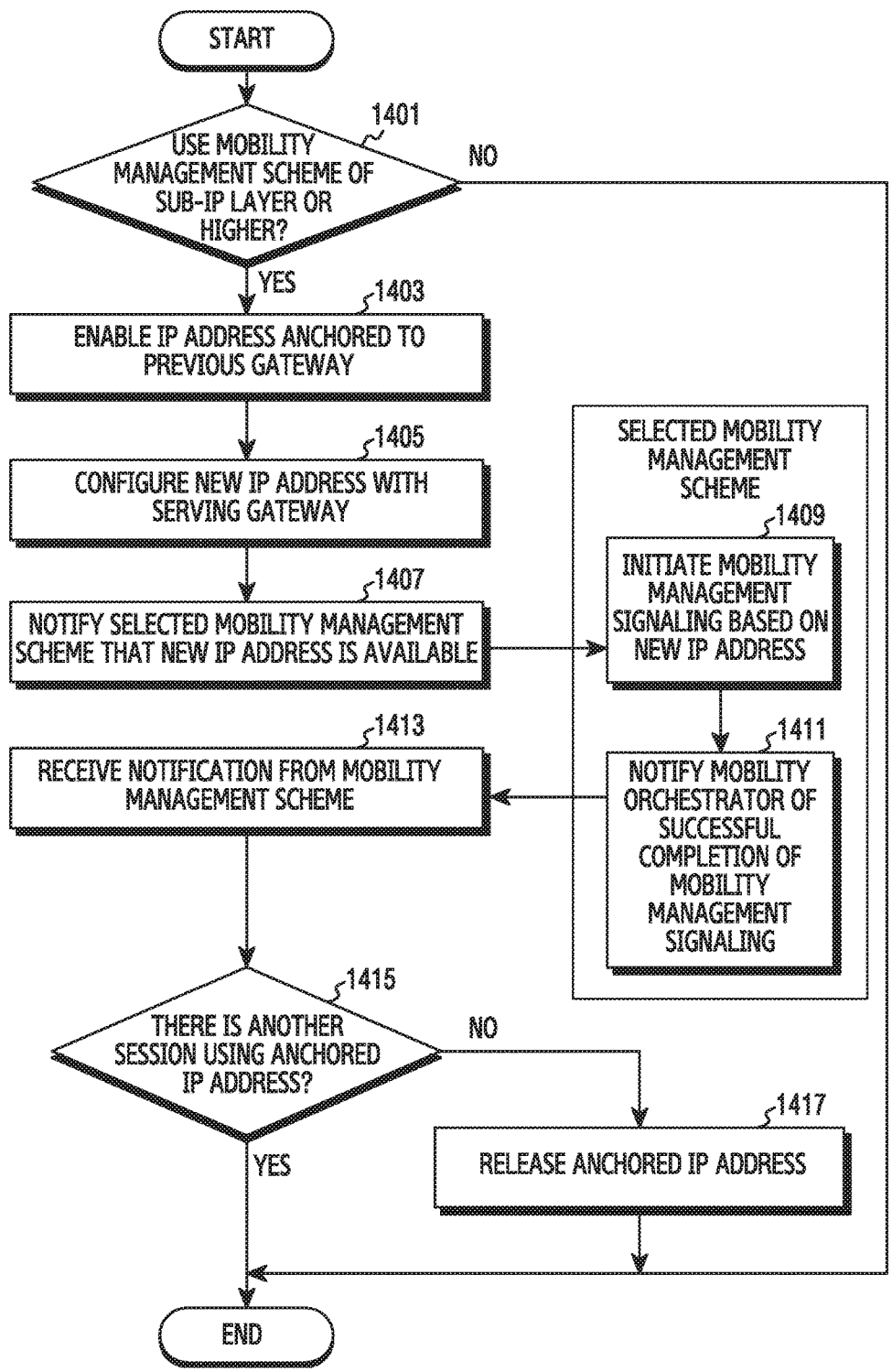
FIG. 14 illustrates an interaction between a mobility orchestrator and a mobility management scheme for a handover in a wireless communication system according to an embodiment of the present invention.

The mobility orchestrator of the terminal may execute an algorithm for determining an optimum set of mobility schemes to be performed for a given data flow. For example, the mobility orchestrator selects a scheme of a highest layer among common mobility management schemes between the terminal and the remote end and disables another mobility scheme. More specifically, when in-app mobility, the SCTP, and the client mobile IP is available, the mobility orchestrator enables the in-app mobility and disables the SCTP and the client mobility IP. However, the mobility orchestrator transiently enables tunneling between gateways by using a scheme which is available on a lowest layer. For example, when the client mobile IP and the proxy mobile IP is available, the mobility orchestrator uses the proxy mobile IP. FIGS. 12, 13, and 14 below are examples of the algorithms.

FIG. 12 illustrates a procedure of selecting a mobility management scheme in a wireless communication system according to an embodiment of the present invention.

Referring to FIG. 12, the terminal identifies an end to end mobility management protocol of the remote end in step 1201. In other words, the terminal identifies an end to end mobility management scheme supported by the remote end. For example, the terminal may identify the mobility management scheme supported by the remote end from a separate server. For example, the separate server may be a DNS server and, in this case, a DNS query may be used.

Subsequently, the terminal proceeds to step 1203 and determines whether there is a common protocol between the terminal and the remote end. In other words, the terminal determines whether at least one common mobility management scheme between the terminal and the remote end is supported. That is, the terminal determine whether at least one mobility management scheme supported by the remote end can be supported.

When there is the common protocol, the terminal proceeds to step 1205 and selects at least one common protocol as a primary mobility management scheme. That is, the end to end mobility management scheme provides a direct data path, and thus the terminal selects the end to end mobility management scheme as a primary scheme for the optimum data path. For example, the terminal may select a scheme of a highest layer among common mobility management schemes. When a plurality of mobility management schemes exist on the same layer, the terminal may select one mobility management scheme based on a preference list. For example, the preference list may be defined as preferring the MPTCP to the SCTP, preferring the client mobile IP to the MOBKE, or the like.

Subsequently, the terminal proceeds to step 1207 and determines whether the access network supports an IP/sub-IP mobility management scheme. In other words, the terminal determines whether the network supports a mobility management scheme based on anchoring, that is, using tunneling. For example, the terminal may determine whether the access network supports the IP/sub-IP mobility management scheme based on information known in advance. In another example, the terminal may identify whether the access network support the IP/sub-IP mobility management scheme by transmitting an inquiry to an entity within the access network. For example, the entity may be a gateway. When whether the IP/sub-IP mobility management scheme is supported is identified at initial access, the inquiry procedure may be omitted.

When the access network supports the IP/sub-IP mobility management scheme, the terminal proceeds to step 1209 and selects one of the at least one IP/sub-IP mobility management scheme supported by the access network as an auxiliary mobility management scheme. In other words, the terminal selects one of the at least one IP/sub-IP mobility management scheme as a mobility management scheme to be used transiently.

In contrast, when the access network does not support the IP/sub-IP mobility management scheme, the terminal proceeds to step 1211 and determines that the auxiliary mobility management scheme is not defined. That is, the terminal does not define the mobility management scheme to be used transiently during a handover process.

When there is no common protocol between the terminal and the remote end in step 1203, the terminal proceeds to step 1213 and determines whether the access network supports the IP/sub-IP mobility management scheme. In other words, the terminal determines whether the network supports a mobility management scheme based on anchoring, that is, using tunneling. For example, the terminal may determine whether the access network supports the IP/sub-IP mobility management scheme based on information known in advance. In another example, the terminal may identify whether the access network support the IP/sub-IP mobility management scheme by transmitting an inquiry to an entity within the access network. For example, the entity may be a gateway. When whether the IP/sub-IP mobility management scheme is supported is identified at initial access, the inquiry procedure may be omitted.

When the access network supports the IP/sub-IP mobility management scheme, the terminal proceeds to step 1215 and selects one of at least one IP/sub-IP mobility management scheme supported by the access network as a primary mobility management scheme. Simultaneously, the terminal determines that the auxiliary mobility management scheme is not defined. That is, the terminal does not define the mobility management scheme to be used transiently during a handover process.

In contrast, when the access network does not support the IP/sub-IP mobility management scheme, the terminal proceeds to step 1217 and determines that the primary mobility management scheme and the auxiliary mobility management scheme are not defined. That is, the terminal determines that any mobility management scheme is not used. In this case, in the handover, a session connection may be disconnected.

FIG. 13 illustrates a procedure of performing a handover based on a selected mobility management scheme in a wireless communication system according to an embodiment of the present invention.

Referring to FIG. 13, the terminal determines whether a mobility management scheme is used in step 1301. For example, when there is no common mobility management scheme between the terminal and the remote end and the access network does not support the mobility management scheme, the mobility management scheme may not be used.

When the mobility management scheme is not used, the terminal proceeds to step 1303 and releases a previous IP address. The previous IP address refers to an IP address allocated by a serving gateway before the handover. Accordingly, the session established based on the previous IP address may be terminated.

Subsequently, the terminal proceeds to step 1305 and a new serving gateway configures a new IP address. That is, the terminal receives the new IP address from the serving gateway after the handover. Accordingly, the terminal may establish a new session based on the new IP address.

When the mobility management scheme is used in step 1301, the terminal proceeds to step 1307 and determines whether the mobility management scheme performed only in the sub-IP is used. That is, the terminal determines whether there is no common higher layer scheme between the terminal and the remote end and the access network supports the mobility management scheme performed in the sub-IP.

When the mobility management scheme performed only the sub-IP is used, the terminal proceeds to step 1309 and anchors the IP address to the previous gateway by using the sub-IP mobility management scheme. Accordingly, after the handover, the terminal is anchored to the previous serving gateway and transmits and receives data through a detour including a tunnel between the current serving gateway and the pervious serving gateway.

When the mobility management scheme performed only in the sub-IP is not used, the terminal proceeds to step 1311 and determines whether only the primary mobility management scheme of the higher layer is used and the auxiliary mobility management scheme is not used. Here, the higher layer refers to a layer higher than or equal to L3 or L4. That is, the terminal determines whether there is the common higher layer scheme between the terminal and the remote end and the access network does not support the mobility management scheme performed in the sub-IP.

When only the primary mobility management scheme of the higher layer is used, the terminal proceeds to step 1313 and releases a previous IP address. The previous IP address refers to an IP address allocated by a serving gateway before the handover.

Subsequently, the terminal proceeds to step 1315, and a new serving gateway configures a new IP address. That is, the terminal receives the new IP address from the serving gateway after the handover. Accordingly, the terminal may establish a new session based on the new IP address.

Subsequently, the terminal proceeds to step 1317 and performs the handover by using the mobility management scheme of the higher layer. The handover refers to a handover of the IP layer. Accordingly, a transmission delay may be generated, but a disconnection of the connection may be prevented. For the handover, the terminal may perform signaling for the handover. The signaling may include at least one of transmission of at least one signal and reception of at least one signal. For example, the terminal may transmit a message informing of the new IP address, that is, an IP address allocated from the serving gateway after the handover to a counterpart end.

When only the primary mobility management scheme of the higher layer is not used in step 1311, the terminal proceeds to step 1319 and anchors the IP address to the previous gateway by using the auxiliary mobility management scheme. The anchoring is made by transient use of the auxiliary mobility management scheme. That is, the terminal requests a tunneling between the previous serving gateway and the new serving gateway to the network and uses the IP address allocated from the previous serving gateway.

Subsequently, the terminal proceeds to step 1321, and the new serving gateway configures a new IP address. That is, the terminal receives the new IP address from the serving gateway after the handover. Accordingly, the terminal may establish a new session based on the new IP address.

Subsequently, the terminal proceeds to step 1323 and performs the handover by using the mobility management scheme of the higher layer. The handover refers to a handover of the IP layer. For the handover, the terminal may perform signaling for the handover. The signaling may include at least one of transmission of at least one signal and reception of at least one signal.

Thereafter, the terminal proceeds to step 1325 and determines whether there is a data flow using the sub-IP mobility management scheme as the primary mobility management scheme. The primary mobility management scheme may be selected according to each data flow. This is because the mobility management scheme of the higher layer is not supported by all applications. Accordingly, there may be a data flow which does not receive the application of the mobility management scheme of the higher layer.

When there is no data flow using the sub-IP mobility management scheme as the primary mobility management scheme, the terminal proceeds to step 1327 and releases the anchored IP address. That is, since there is no data flow which does not receive the application of the mobility management scheme of the higher layer, it is not required to maintain the transiently generated tunnel after the IP handover. Accordingly, the terminal controls all data paths to have the direct path by releasing the anchored IP address.

FIG. 14 illustrates an interaction between a mobility orchestrator and a mobility management scheme for a handover in a wireless communication system according to an embodiment of the present invention.

Referring to FIG. 14, in step 1401, the mobility orchestrator determines whether a mobility management scheme of the sub-IP layer or higher is used. When the mobility management scheme of the sub-IP layer or higher is used, the mobility orchestrator enables an IP address anchored to a previous serving gateway in step 1403. Subsequently, in step 145, the mobility orchestrator configures a new IP address with a new serving gateway. In step 1407, the mobility orchestrator notifies an availability of the new IP address to the selected mobility management scheme. Accordingly, in step 1409, the mobility management scheme initiates mobility management signaling based on the new IP address. In step 1411, the mobility management scheme notifies successful completion of the mobility management signaling to the mobility orchestrator. Accordingly, in step 1413, the mobility orchestrator receives the notification from the mobility management scheme. Thereafter, in step 1415, the mobility orchestrator determines whether there is another session using the anchored IP address. When there is no another session using the anchored IP address, the mobility orchestrator releases the anchored IP address in step 1417.

Figure 15:
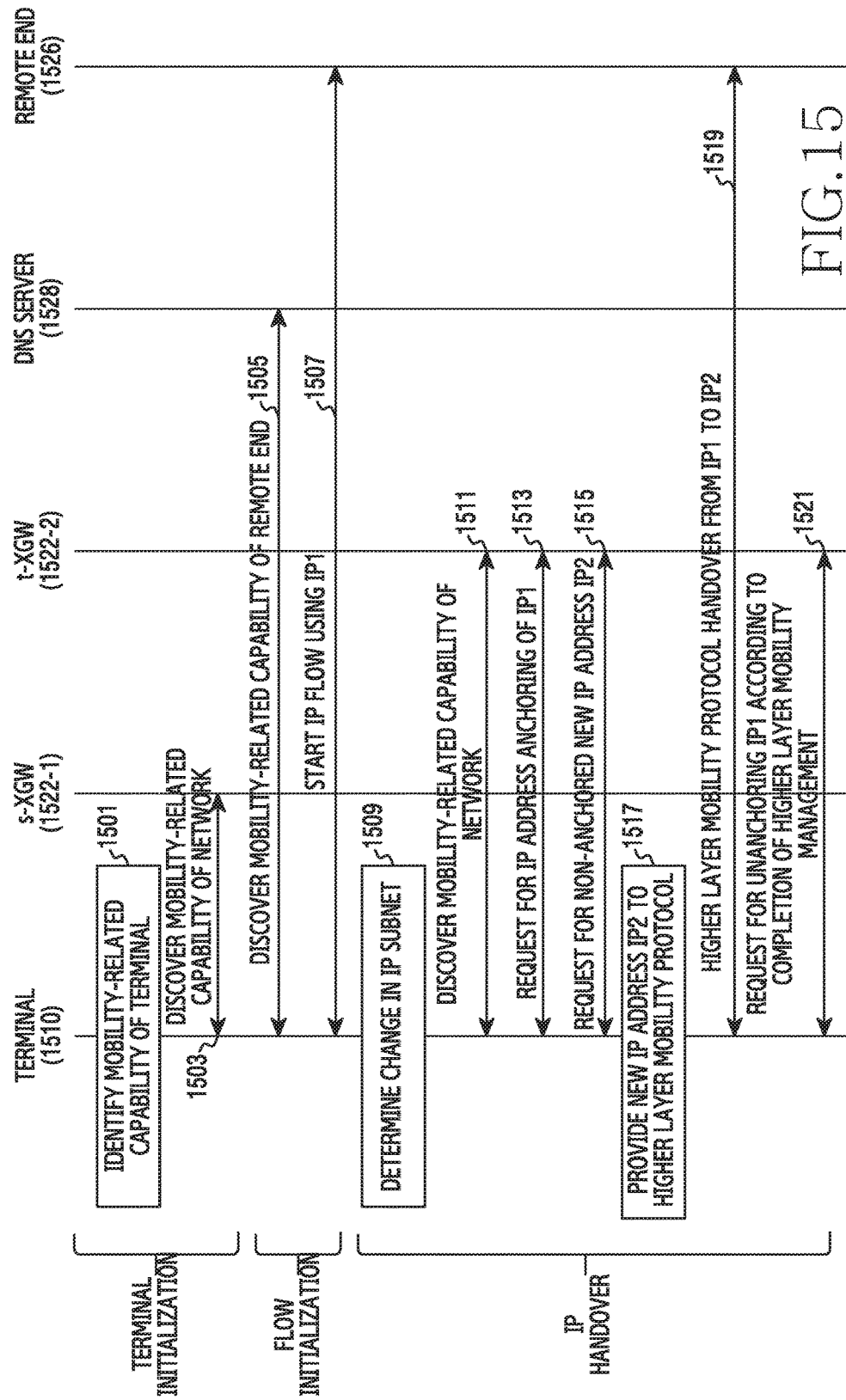
FIG. 15 illustrates a signaling procedure between a terminal and network entities in a wireless communication system according to an embodiment of the present invention.

FIG. 15 illustrates a signaling procedure between the terminal and network entities in a wireless communication system according to an embodiment of the present invention. FIG. 15 illustrates a signaling procedure from initial access of the terminal to a handover. In the embodiment illustrated in FIG. 15, signaling, which is not directly related to the present invention, is omitted.

Referring to FIG. 15, in step 1501, a terminal 1510 identifies a mobility-related capability of the terminal 1510. In other words, the terminal 1510 identifies at least one mobility management scheme supported by the terminal 1510 itself.

In step 1503, the terminal 1510 discovers a mobility-related capability of a network through a source access gateway 1522-1. For example, the terminal 1510 may transmit a message for requesting the mobility-related capability to the source access gateway 1522-1 and receive a response message from the source access gateway 1522-1. For example, the terminal 1510 may perform the procedure as illustrated in FIG. 10.

In step 1505, the terminal 1510 discovers a mobility-related capability of a remote end 1526. To this end, the terminal 150 may transmit a message for requesting the mobility-related capability of the remote end 1526 to a DNS server 1528 and receive a response message from the DNS server 1528. For example, the message requesting for the mobility-related capability may be included in a DNS query. For example, the terminal 1510 may perform the procedure as illustrated in FIG. 11.

In step 1507, the terminal 1510 may start an IP flow with the remote end 1526 based on an IP address IP1. In other words, the terminal 1510 and the remote end 1526 may transmit and receive data through a data flow configured based on IP1.

In step 1509, the terminal 1510 determines a change in an IP subnet. That is, the IP subnet may be changed by movement of the terminal 1510, and the terminal 1510 may recognize the change in the IP subnet.

In step 1511, the terminal 1510 discovers the mobility-related capability of the network through a target access gateway 1522-2. For example, the terminal 1510 may transmit a message for requesting the mobility-related capability to the target access gateway 1522-2 and receive a response message from the target access gateway 1522-2. For example, the terminal 1510 may perform the procedure as illustrated in FIG. 10.

In step 1513, the terminal 1510 requests IP address anchoring for IP1. That is, the terminal 1510 generates a tunnel between the target access gateway 1522-2 and the source access gateway 1522-1 and request a data detour to the target access gateway 1522-2.

In step 1515, the terminal 1510 requests to allocate a new IP address IP2 which has not been anchored. That is, since the IP1 anchoring is transient, the terminal 1510 requests to allocate the IP address to form a direct path.

In step 1517, the terminal 1510 provides the new IP address IP2 to a higher layer mobility protocol. That is, for the handover by the mobility management scheme of the higher layer, the terminal 1510 internally provides IP2 to the mobility management scheme of the higher layer.

In step 1519, the terminal 1510 performs a higher layer mobility protocol handover from IP1 to IP2. The handover may be performed according to a procedure defined by the mobility management scheme of the higher layer. That is, the terminal 1510 may perform signaling by the handover. The signaling may include at least one of transmission of at least one signal and reception of at least one signal.

In step 1521, the terminal 1510 requests to unanchor IP1 according to the completion of the higher layer mobility management. That is, since the direct path with the remote end 1526 through the target access gateway 1522-2 is configured due to the handover, the terminal 1510 requests to unanchor in order to remote the transiently used detour.

Figure 16:
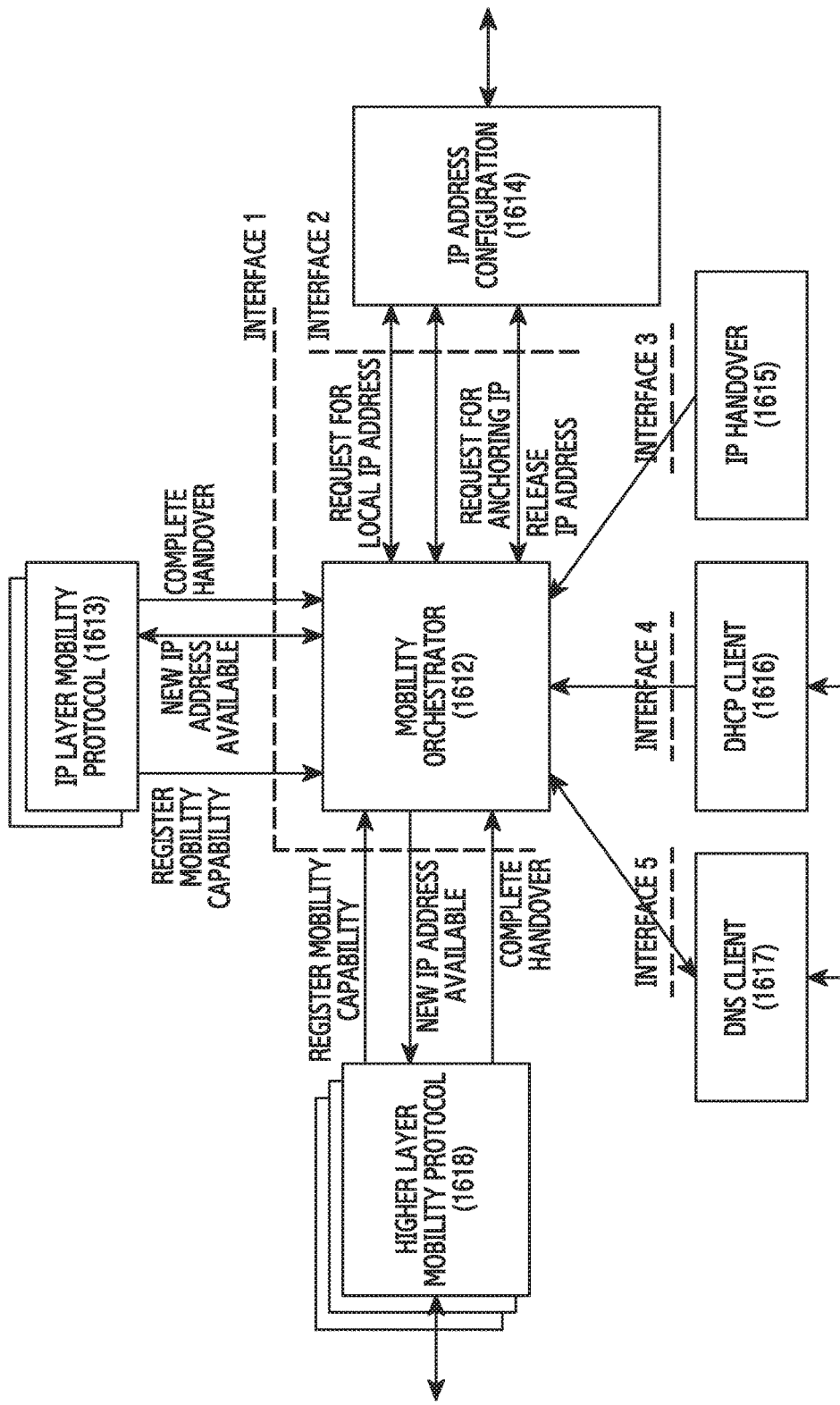
FIG. 16 illustrates an example of a functional structure of a terminal in a wireless communication system according to an embodiment of the present invention.

FIG. 16 illustrates an example of a functional structure of a terminal in a wireless communication system according to an embodiment of the present invention.

Referring to FIG. 16, the terminal includes a mobility orchestrator 1612, an IP layer mobility protocol module 1613, an IP address configuration module 1614, an IP handover module 1615, a DHCP client module 1616, a DNS client module 1617, and a higher layer mobility protocol module 1618.

The mobility orchestrator 1612 interacts with the IP layer mobility protocol module 1613 and the higher layer mobility protocol module 1618 to discover their existence.

The IP handover module 1615 detects a change in an IP subnet and triggers an operation of the mobility orchestrator 1612. The mobility orchestrator 1612 interacts with the IP address configuration module 1614 according to an IP handover. The IP address configuration module 1614 may operate according to a plurality of protocols such as a DHCP, an IPv6 stateless address autoconfiguration (SLAAC), a packet data protocol (PDP), and the like. A client side of the protocols is included in the terminal and operates with a server side existing outside the terminal according to each protocol. According to a data flow and relevant mobility schemes managed by the mobility orchestrator 1612, at least one anchored IP address may be requested by the mobility orchestrator 1612 according to the IP handover and a non-anchored, that is, a local IP address may be requested by the mobility orchestrator 1612 according to the IP handover.

When a new IP address is available and the mobility orchestrator 1612 knows that the IP-layer or the higher layer mobility protocol is waiting for being used, the mobility orchestrator 1612 notifies the mobility protocol modules 1613 and 1618 of the use of the new IP address. When each of the mobility protocols 1613 and 1618 completes the IP handover, the mobility orchestrator 1612 is notified of the completion of the IP handover. Accordingly, the mobility orchestrator 1612 determines a time point at whether the IP address is released and notifies the IP address configuration module 1614 of the release of the IP address.

The mobility orchestrator 1612 may interact with the DHCP client module 1616 to discover a mobility capability of a network. The DHCP client module 1616 and a DHCP server, which is an external entity, may perform signaling and calculation according to a DHCP protocol in turn. The IP address configuration module 1614 may perform signaling according to the DHCP. Accordingly, the DHCP client module 1616 may be included in the IP address configuration module 1614. The mobility orchestrator 1612 may interact with the DHCP client module 1617 to acquire a mobility capability of the remote end. The DNS client module 1617 controls signaling with external DNS servers according to a DNS protocol.

Referring to FIG. 16, interface 1 between the mobility orchestrator 1612, and the IP layer mobility protocol module 1613 and the higher layer mobility protocol module 1618 is defined, interface 2 between the mobility orchestrator 1612 and the IP address configuration module 1614 is defined, interface 3 between the mobility orchestrator 1612 and the IP handover module 1615 is defined, interface 4 between the mobility orchestrator 1612 and the DHCP client module 1616 is defined, and interface 5 between the mobility orchestrator 1612 and the DNS client module 1617 is defined. For example, functions provided by each interface may be defined as [Table 1] to [Table 5] below.

TABLE 1

| | Interface 1 |
|---|---|
| End point | Mobility orchestrator- IP layer mobility protocol module and higher layer mobility protocol module |
| Function | Handover_done (IPaddr) called by mobility protocol when handover from parameter "IPaddr" is completed (IPaddr is no longer needed by mobility protocol) New_IP_address_available (IPaddr) called by mobility orchestrator when new IP address is configured in terminal Register_mobility_capability (capabilities) called by mobility orchestrator to indicate mobility-related capability of terminal Parameter "capabilities" is list of flags mapped to each capability Flag 0 may process IP mobility and refers to desire of notification when new IP address is available Other flags are reserved to be used in the future |

TABLE 2

| | Interface 2 |
|---|---|
| End point | Mobility orchestrator - IP address configuration module |
| Function | Request_local_IPaddr called by mobility orchestrator when local (non-anchored) IP address but local IP address is not currently configured in terminal IP address configuration module configures local IP Address and returns local FP address value to caller |

TABLE 2-continued

| | Interface 2 |
|---|---|
| | Request_IP_anchoring (IPaddr) called by mobility orchestrator when parameter "IPaddr" is required to be anchored (for example, it is required to maintain continuity by aid of tunnel between terminal/serving gateway and anchor gateway) Release_IP_address (IPaddr) called by mobility orchestrator when parameter "IPaddr" can be released |

TABLE 3

| | Interface 4 |
|---|---|
| End point | Mobility orchestrator - IP handover module |
| Function | IP_subnet_change_detected called by IP handover module when it is detected that terminal passes through IP subnet boundary |

TABLE 4

| | Interface 4 |
|---|---|
| End point | Mobility orchestrator - DHCP client module |
| Function | Discover_Network_Mobility_Capability called by DHCP client module when terminal accesses new network List of flags indicating supported capabilities is returned For example, Flag 0: support PMIPv4 Flag 1: support PMIPv6 Flag 2: support CMIPv4 FA Flag 3: support GTP |

TABLE 5

| | Interface 5 |
|---|---|
| End point | Mobility orchestrator - DNS client module |
| Function | Discover_Network_Mobility_Capability (hostname) called by mobility orchestrator to discover mobility capability of remote end of communication List of flags indicating supported capabilities is returned For example) Flag 0: MPTCP Flag 1: SCTP Flag 2: HIP |

Figure 17:
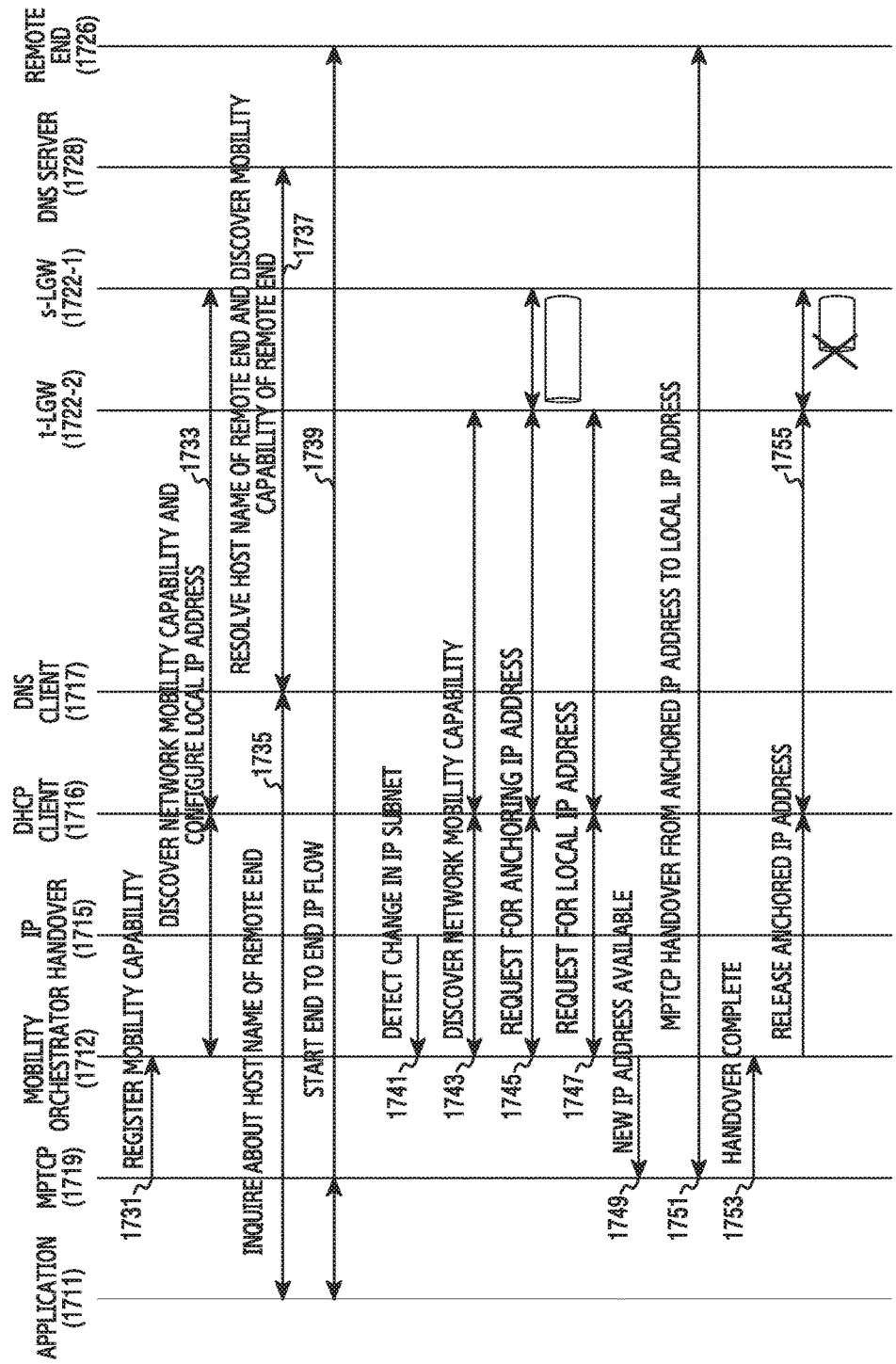
FIG. 17 illustrates a signaling procedure between functional elements of a terminal and network entities in a wireless communication system according to an embodiment of the present invention.

FIG. 17 illustrates a signaling procedure between functional elements of a terminal and network entities in a wireless communication system according to an embodiment of the present invention.

Referring to FIG. 17, in step 1731, an MPTCP 1719 registers a mobility capability in a mobility orchestrator 1712. For example, the MPTCP 1719 may use the function "Register_mobility_capability (capabilities)" shown in [Table 1] above.

In step 1733, the mobility orchestrator 1712 discovers a mobility capability of a network by using a DHCP client module 1716 and configures a local IP address. For example, the DHCP client module 1716 may use the function "Discover_Network_Mobility_Capability" shown in [Table 4] above. Accordingly, a source access gateway 1722-1 provides mobility-related capability information of the network.

In step 1735, an application 1711 inquires the DNS client module 1717 about a host name of a remote end 1726. In other words, the application 1711 triggers the DNS client module 1717 to transmit a DNS query to a DNS server 1728. Accordingly, the DNS client module 1717 requests the host name of the remote end 1726 to the DNS server. The host name may be requested through a DNS query, and the DNS query may include a request for the mobility capability.

In step 1737, the DNS client module 1717 receives the host name of the remote end 1726 from the DNS server 1728 and discovers the mobility-related capability of the remote end 1726. That is, the DNS server 1728 provides the host name of the remote end 1726 and the mobility-related capability information of the remote end 1726.

In step 1739, the application 1711 and the remote end 1726 start an end to end IP flow. Accordingly, the application 1711 and the remote end 1726 transmit and receive data through the IP flow.

In step 1741, the IP handover module 1715 detects a change in an IP subnet and notifies the mobility orchestrator 1712 of the change in the IP subnet. To this end, the IP handover module 1715 may use the function "IP_subnet_change_detected" shown in [Table 3] above.

In step 1743, the mobility orchestrator 1712 discovers a network mobility capability through the DHCP client module 1716. For example, the DHCP client module 1716 may use the function "Discover_NetworkMobility_Capability" shown in [Table 4] above. Accordingly, a target access gateway 1722-2 provides mobility-related capability information of the network.

In step 1745, the mobility orchestrator 1712 requests IP address anchoring to the target access gateway 1722-2 through the DHCP client module 1716. That is, the mobility orchestrator 1712 generates a tunnel between the target access gateway 1722-2 and the source access gateway 1722-1 and requests a data detour to the target access gateway 1722-2. To this end, the mobility orchestrator 1712 may use the function "'Request_IP_anchoring (IPaddr)" shown in [Table 2] above. In this case, the parameter "IPaddr" is configured as an IP address allocated from the source access gateway 1722-1. According to another embodiment of the present invention, step 1745 may be performed through the IP address configuration module 1614.

In step 1747, the mobility orchestrator 1712 requests a new IP address, which has not been anchored to the target access gateway 1722-2, that is, a local IP address through the DHCP client module 1716. That is, since the anchoring is transient, the mobility orchestrator 1712 requests to allocate the IP address to form a direct path. To this end, the mobility orchestrator 1712 may use the function "Request_local_IPaddr" shown in [Table 2] above. According to another embodiment of the present invention, step 1747 may be performed through the IP address configuration module 1614.

In step 1749, the mobility orchestrator 1712 informs the MPTCP 1719 that the new IP address is available. To this end, the mobility orchestrator 1712 may use the function "New_IP_address_available (IPaddr)" shown in [Table 1] above. In this case, the parameter "IPaddr" is configured as an IP address allocated from the target access gateway 1722-2.

In step 1751, the MPTCP 1719 performs an MTPCP handover from the anchored IP address to the local IP address. The handover may be performed according to a procedure defined by the MPTCP. That is, the MPTCP 1719 may perform signaling for the handover. The signaling may include at least one of transmission of at least one signal and reception of at least one signal.

In step 1753, the MPTCP 1719 notifies the mobility orchestrator 1712 of the completion of the handover. To this end, the MPTCP 1719 may use the function "Handoverdone (IPaddr)" shown in [Table 1] above.

In step 1755, the mobility orchestrator 1712 releases the anchored IP address. To this end, the mobility orchestrator 1712 may use the function "Release_IP_address (IPaddr)" shown in [Table 2] above. In this case, the parameter "IPaddr" is configured as an IP address allocated from the source access gateway 1722-1. According to another embodiment of the present invention, step 1755 may be performed through the IP address configuration module 1614.

Figure 18:
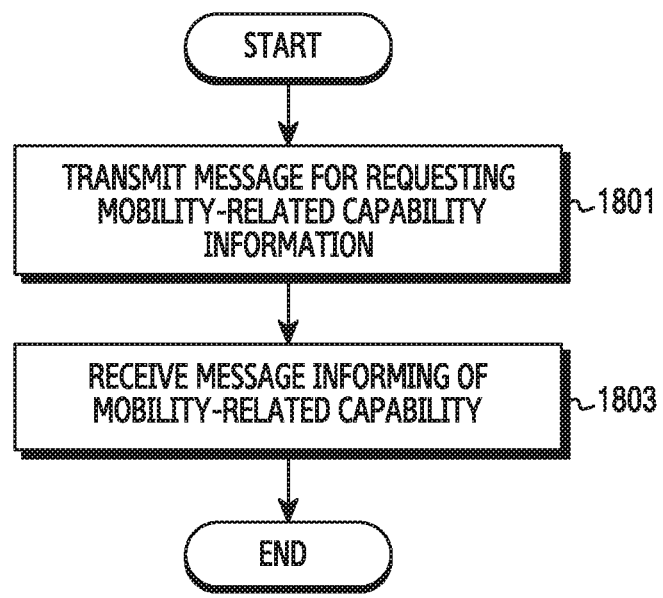
FIG. 18 illustrates an operation procedure of a terminal in a wireless communication system according to an embodiment of the present invention.

FIG. 18 illustrates an operation procedure of a terminal in a wireless communication system according to an embodiment of the present invention.

Referring to FIG. 18, the terminal transmits a message for requesting mobility-related capability information in step 1801. Here, the requested mobility-related capability information may be mobility-related capability information of a network or a counterpart end which performs communication. For example, when the mobility-related capability information of the network is requested, the terminal may transmit the message to a gateway in initial access or a handover. In another example, when the mobility-related capability information of the counterpart end is requested, the terminal may transmit the message to a DNS server when a data flow with the counterpart end is generated. However, according to another embodiment of the present invention, the terminal may transmit the message to the counterpart end.

Subsequently, the terminal proceeds to step 1803 and receives a message informing of the mobility-related capability. For example, when mobility-related capability information of the network is requested, the terminal receives the mobility-related capability information of the network from the gateway. In this case, the message may inform of at least one mobility management scheme performed on an IP layer or a sub-IP layer supported by the network. In another example, when mobility-related capability information of the counterpart end is requested, the terminal receives the mobility-related capability information of the counterpart end from the DNS server. In this case, the message may inform of at least one mobility management scheme (for example, mobility management scheme performed on a higher layer) performed in an end to end type supported by the counterpart end.

Figure 19:
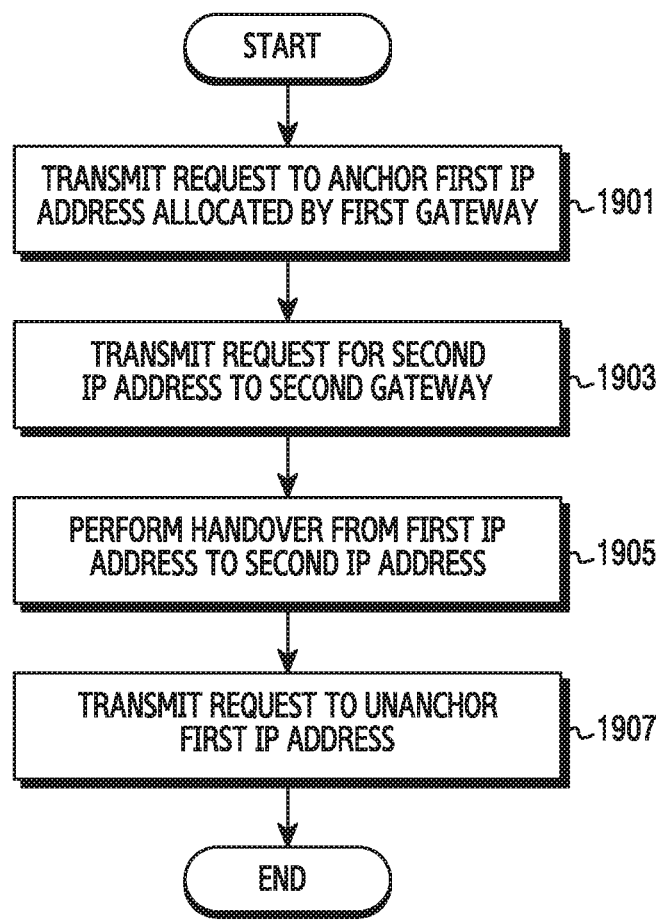
FIG. 19 illustrates an operation procedure of a terminal in a wireless communication system according to another embodiment of the present invention.

FIG. 19 illustrates an operation procedure of a terminal in a wireless communication system according to another embodiment of the present invention.

Referring to FIG. 19, the terminal transmits a request to anchor a first IP address allocated by a first gateway in step 1901. That is, the terminal has performed a handover by movement and, accordingly, an IP subnet is changed. Accordingly, a serving gateway is changed, and a request to anchor the first gateway, which is the previous gateway way, to a second gateway, which is a new access gateway, is made.

Subsequently, the terminal proceeds to step 1903 and transmits a request to allocate a second IP address to the second gateway. That is, the terminal requests to allocate a local IP address. Accordingly, the terminal receives the allocation of the second IP address. Further, the terminal may configure a direct path using the second IP address.

Subsequently, the terminal proceeds to step 1905 and performs a handover between the first IP address and the second IP address. The handover may be performed by a mobility management scheme supported in common between the terminal and the counterpart end. To this end, the terminal may perform signaling for the handover.

Thereafter, the terminal proceeds to step 1907 and transmits a request to unanchor the first IP address. That is, when the handover between the IP addresses is completed, the request to unanchor is made to transmit/receive data through the direct path via the second gateway rather than through a detour based on the anchoring. That is, the anchoring is transiently maintained while the handover procedure is performed. To this end, the terminal may request to release the first IP address to the first gateway. Accordingly, the terminal configures a source address of a packet transmitted to the counterpart end as the second IP address.

Figure 20:
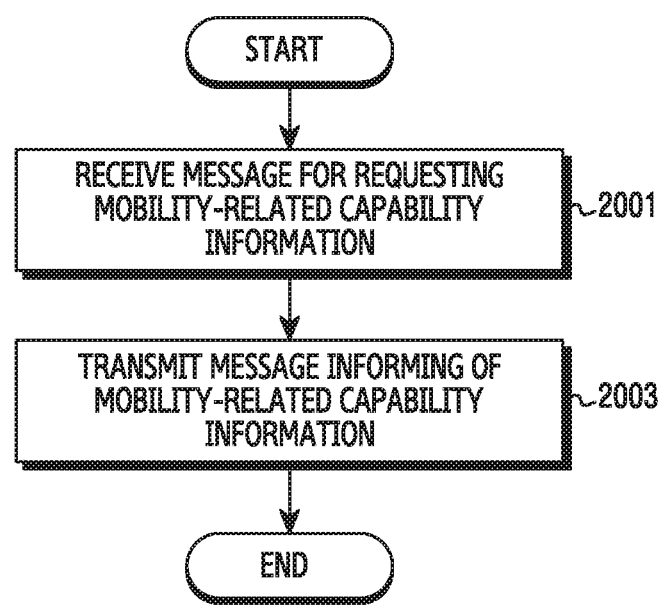
FIG. 20 illustrates an operation procedure of a network entity in a wireless communication system according to an embodiment of the present invention.

FIG. 20 illustrates an operation procedure of a network entity in a wireless communication system according to an embodiment of the present invention. The network entity, which is an operation subject of FIG. 20, may be one of a gateway and a DNS server.

Referring to FIG. 20, the network entity receives a message for requesting mobility-related capability information from a terminal in step 2001. Here, the requested mobility-related capability information may be mobility-related capability information of a network or a counterpart end which performs communication. For example, when the network entity is the gateway, the request for the mobility-related capability information of the network is made. In another example, when the network entity is the DNS server, the request for the mobility-related capability information of the counterpart end, which communicates with the terminal, is made.

Subsequently, the network entity proceeds to step 2003 and transmits a message informing of the mobility-related capability. For example, when the network entity is the gateway, the message may inform of at least one mobility management scheme performed on an IP layer or a sub-IP layer supported by the network. In another example, when the network entity is the DNS server, the message may inform of at least one mobility management scheme (for example, mobility management scheme performed on a higher layer) performed in an end to end type supported by the counterpart end.

Figure 21:
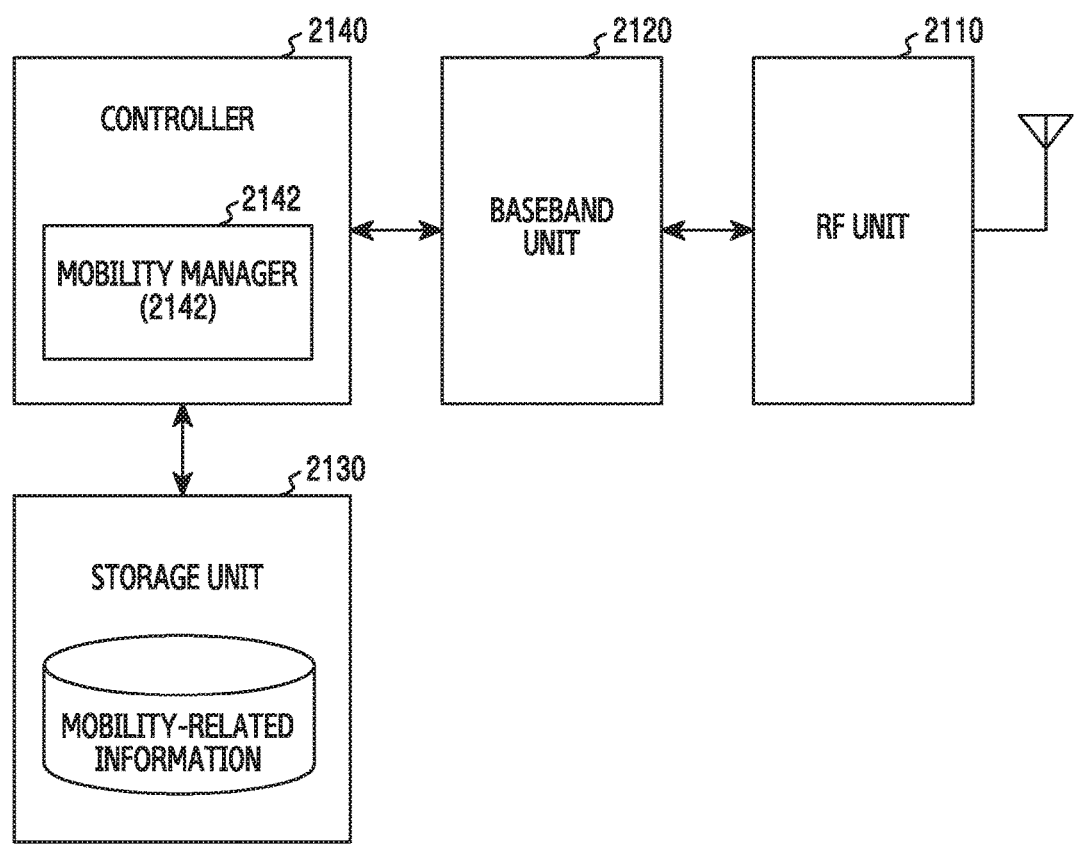
FIG. 21 is a block diagram of a terminal in a wireless communication system according to another embodiment of the present invention.

FIG. 21 is a block diagram of a terminal in a wireless communication system according to another embodiment of the present invention.

Referring to FIG. 21, the terminal includes an Radio Frequency (RF) processing unit 2110, a baseband processing unit 2120, a storage unit 2130, and a controller 2140.

The RF processing unit 2110 performs a function for transmitting and receiving a signal through a wireless channel, such as band conversion and amplification of a signal. That is, the RF processing unit 2110 up-converts a baseband signal provided from the baseband unit 2120 into an RF band signal and then transmits the converted signal through an antenna, and down-converts an RF band signal received through the antenna into a baseband signal. For example, the RF processing unit 2110 may include at least one of a transmission filter, a reception filter, an amplifier, a mixer, an oscillator, a Digital-to-Analog Converter (DAC), and an Analog-to-Digital Converter (ADC). Although only one antenna is illustrated in FIG. 21, the terminal may include a plurality of antennas. In addition, the RF processing unit 2110 may include a plurality of RF chains. Moreover, the RF processing unit 2110 may perform beamforming. For the beamforming, the RF processing unit 2110 may control a phase and a size of each signal transmitted/received through a plurality of antennas or antenna elements.

The baseband processing unit 2120 performs a function for a conversion between a baseband signal and a bitstream according to a physical layer standard of the system. For example, when data is transmitted, the baseband processing unit 2120 generates complex symbols by encoding and modulating a transmission bitstream. Further, when data is received, the baseband processing unit 2120 reconstructs a reception bitstream by demodulating and decoding a baseband signal provided from the RF processing unit 2110. For example, in an orthogonal frequency division multiplexing (OFDM) scheme, when data is transmitted, the baseband processing unit 2120 generates complex symbols by encoding and modulating a transmission bitstream, mapping the complex symbols to subcarriers, and then configures OFDM symbols through an inverse fast Fourier transform (IFFT) operation and a cyclic prefix (CP) insertion. Further, when data is received, the baseband processing unit 2120 divides the baseband signal provided from the RF processor 2110 in the unit of OFDM symbols, reconstructs the signals mapped to the subcarriers through a fast Fourier transform (FFT) operation, and then reconstructs a reception bitstream through demodulation and decoding.

The baseband processing unit 2120 and the RF processing unit 2110 transmit and receive signals as described above. Accordingly, the baseband processing unit 2120 and the RF processing unit 2110 may be referred to as a transmitter, a receiver, a transceiver, or a communication unit. Further, at least one of the baseband processing unit 2120 and the RF processing unit 2110 may include a plurality of communication modules to support a plurality of different communication standards. In addition, at least one of the baseband processing unit 2120 and the RF processing unit 2110 may include different communication modules to process signals of different frequency bands.

The storage unit 2130 stores data such as a basic program, an application program, and setting information for the operation of the terminal. Particularly, the storage unit 2130 may include mobility-related information. The mobility-related information includes information on at least one mobility management scheme supported by the terminal, the counterpart end, which performs communication, the access network, or the like, and at least one mobility management scheme selected to be used when the terminal changes an IP subnet. In addition, the storage unit 2130 provides data stored therein according to a request of the controller 2140.

The controller 2140 controls overall operations of the terminal. For example, the controller 2140 transmits/receives a signal through the baseband processing unit 2120 and the RF processing unit 2110. Further, the controller 2140 record data in the storage unit 2130 and read the data. To this end, the controller 2140 may include at least one processor. For example, the controller 2140 may include a communication processor (CP) that performs a control for communication, and an application processor (AP) that controls a higher layer such as an application program. According to an embodiment of the present invention, the controller 2140 includes a mobility manager 2142 that manages mobility according to the change in the IP subnet by movement of the terminal. The mobility manager 2142 may control general functions of mobility management. For example, the mobility manager 2142 may perform at least one function of the mobility orchestrator 1612 and at least one module illustrated in FIG. 16. For example, the controller 2140 may control the terminal to perform the procedures illustrated in FIGS. 5A to 6F, FIG. 6, FIGS. 7A and 9B, FIG. 10, FIG. 11, FIG. 12, FIG. 13, FIG. 14, FIG. 15, FIG. 17, FIG. 18, and FIG. 19. The operation of the controller 2140, according to an embodiment of the present invention, is as described below.

According to an embodiment of the present invention, the controller 2140 generates a message for a request for mobility-related capability information and transmits the message through the baseband processing unit 2120 and the RF processing unit 2110. Here, the requested mobility-related capability information may be mobility-related capability information of a network or a counterpart end which performs communication. Subsequently, the controller 2140 receives a message informing of the mobility-related capability. For example, when mobility-related capability information of the network is requested, the controller 2140 receives the mobility-related capability information of the network from the gateway. In this case, the message may inform at least one mobility management scheme performed on an IP layer or a sub-IP layer supported by the network. In another example, when mobility-related capability information of the counterpart end is requested, the controller 2140 receives the mobility-related capability information of the counterpart end from the DNS server. In this case, the message may inform of at least one mobility management scheme (for example, mobility management scheme performed on a higher layer) performed in an end to end type supported by the counterpart end.

According to another embodiment of the present invention, the controller 2140 may operate as described below when a handover in which an IP subnet is changed is performed. The controller 2140 transmits a request to anchor a first IP allocated by a first gateway. Subsequently, the controller 2140 transmits a request to allocate a second IP address to a second gateway. Accordingly, the controller 2140 receives the allocation of the second IP address. Further, the controller 2140 may configure a direct path using the second IP address. The controller 2140 performs a handover between the first IP address and the second IP address. The handover may be performed by a mobility management scheme supported in common between the terminal and the counterpart end. Thereafter, when the handover between the IP addresses is completed, the controller 2140 transmits a request to unanchor the first IP address to transmit data through the direct path via the second gateway rather than through a detour based on the anchoring. To this end, the controller 2140 may request to release the first IP address to the first gateway. Accordingly, the controller 2140 configures a source address of a packet transmitted to the counterpart end as the second IP address.

Figure 22:
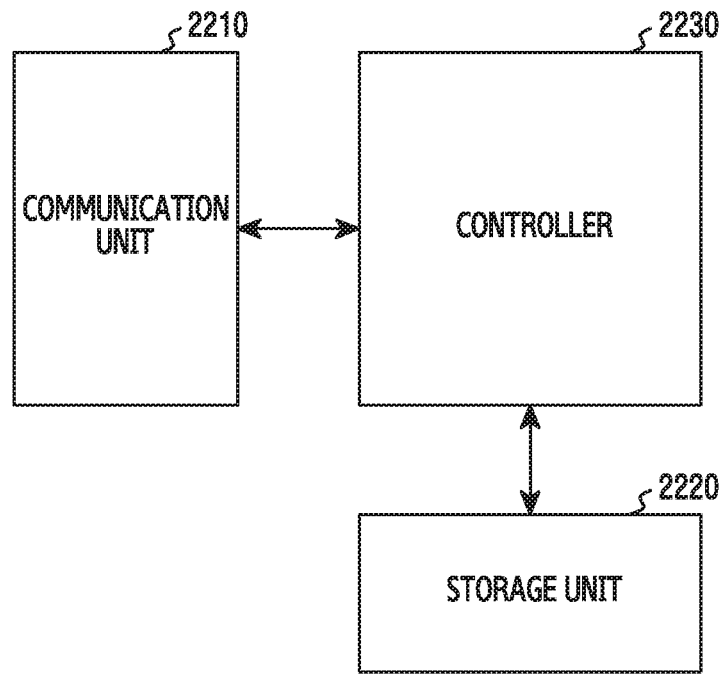
FIG. 22 is a block diagram of a network entity in a wireless communication system according to an embodiment of the present invention.

FIG. 22 is a block diagram of a network entity in a wireless communication system according to an embodiment of the present invention. The block diagram illustrated in FIG. 22 may be applied to a gateway or a DNS server.

As illustrated in FIG. 22, the network entity includes a communication unit 2210, a storage unit 2220, and a controller 2230.

The communication unit 2210 provides an interface for communicating with other entities within the network. That is, the communication unit 2210 converts a bitstream transmitted from the network entity to an another node, for example, a gateway, a base station, or the like into a physical signal and converts a physical signal received from the other node into a bitstream. That is, the communication unit 2210 may transmit and receive a signal. Accordingly, the communication unit 2210 may be referred to as a transmitter, a receiver, or a transceiver.

The storage unit 2220 stores data such as a basic program, an application program, and setting information for the operation of the network entity. In addition, the storage unit 2220 provides data stored therein according to a request of the controller 2230.

The controller 2230 controls general operations of the network entity. For example, the controller 2230 transmits/receives a signal through the communication unit 2210. In addition, the controller 2230 may record data in the storage unit 2220 and read the data. According to an embodiment of the present invention, the controller 2230 may provide mobility-related capability information according to a request of the terminal. For example, the controller 2230 controls the network entity to perform the procedure illustrated in FIG. 10 or FIG. 11. The operation of the controller 2230, according to an embodiment of the present invention, is described below.

According to an embodiment of the present invention, the controller 2230 receives a message for a request for mobility-related capability information from the terminal. Here, the requested mobility-related capability information may be mobility-related capability information of a network or a counterpart end which performs communication. For example, when the network entity is the gateway, the request for the mobility-related capability information of the network is made. In another example, when the network entity is the DNS server, the request for the mobility-related capability information of the counterpart end, which communicates with the terminal, is made. Subsequently, the controller 2230 transmits a message informing of the mobility-related capability to the terminal. For example, when the network entity is the gateway, the message may inform of at least one mobility management scheme performed on an IP layer or a sub-IP layer supported by the network. In another example, when the network entity is the DNS server, the message may inform of at least one mobility management scheme (for example, mobility management scheme performed on a higher layer) performed in an end to end type supported by the counterpart end.

Methods stated in claims and/or specifications according to various embodiments may be implemented by hardware, software, or a combination of hardware and software.

In the implementation of software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present invention as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present invention, a component included in the present invention is expressed in the singular or the plural according to a presented detailed embodiment. However, the singular or plural expressions are selected to be suitable for proposed situations for convenience of description, and the present invention is not limited to the singular or plural elements. An element expressed in a plural form may be configured in singular, or an element expressed in a singular form may be configured in plural.

Although the embodiment has been described in the detailed description of the present invention, the present invention may be modified in various forms without departing from the scope of the present invention. Therefore, the scope of the present invention should not be defined as being limited to the embodiments, but should be defined by the appended claims and equivalents thereof.

The invention claimed is:

1. A method for operating a terminal in a wireless communication system, the method comprising:
   transmitting a first message for requesting mobility-related capability information of an access network, in response to a change of an internet protocol (IP) address of the terminal;
   receiving a second message including the mobility-related capability information of the access network;
   determining a first mobility management scheme supported by a counterpart end of the terminal and the access network, and a second mobility management scheme supported by the access network based on the mobility-related capability information;
   enabling the second mobility management scheme to anchor the IP address of the terminal for performing a handover; and
   enabling the first mobility management scheme to perform the handover.

2. The method of claim 1, further comprising:
   transmitting a third message for requesting mobility-related capability information of a counterpart end that performs communication; and
   receiving a fourth message including the mobility-related capability information of the counterpart end.

3. The method of claim 2, wherein the third message is transmitted to a server that provides an IP address corresponding to a host name of the counterpart end.

4. The method of claim 1, further comprising:
   in response to a serving gateway changing from a first gateway to a second gateway due to movement of the terminal, requesting to anchor a first IP address allocated by the first gateway;
   performing a handover from the first IP address to a second IP address allocated by the second gateway; and
   requesting to unanchor the first IP address.

5. The method of claim 1, further comprising:
   in response to a serving gateway changing from a first gateway to a second gateway due to movement of the terminal, transmitting data through a first path via the first gateway while a handover procedure is performed; and
   after the handover is completed, transmitting data through a second path via the second gateway.

6. The method of claim 5, wherein the transmitting of the data through the first path via the first gateway comprises configuring a source address of a transmitted packet as an IP address allocated by the first gateway.

7. The method of claim 1, wherein the mobility-related capability information is used to determine at least one mobility management scheme for the terminal.

8. A method for operating a network entity in a wireless communication system, the method comprising:
   receiving, from a terminal, a first message for requesting mobility-related capability information, in response to a change of an internet protocol (IP) address of the terminal; and
   transmitting, to the terminal, a second message including the mobility-related capability information,
   wherein the mobility-related capability information is used to determine a first mobility management scheme supported by a counterpart end of the terminal and an access network, and a second mobility management scheme supported by the access network, and
   wherein the the second mobility management scheme is enabled to anchor the IP address of the terminal for performing a handover and the first mobility management scheme is enabled to perform the handover.

9. The method of claim 8, wherein the mobility-related capability information comprises information on at least one mobility management scheme supported by an access network of the terminal or at least one mobility management scheme supported by a counterpart end that communicates with the terminal.

10. An apparatus for a terminal in a wireless communication system, the apparatus comprising:
    a transmitter;
    a receiver; and
    at least one processor coupled with the transmitter and the receiver,
    wherein the at least one processor is configured to:
       transmit a first message for requesting mobility-related capability information of an access network, in response to a change of an internet protocol (IP) address of the terminal,
       receive a second message informing of the mobility-related capability information of the access network,
       determine a first mobility management scheme supported by a counterpart end of the terminal and the access network, and a second mobility management scheme supported by the access network based on the mobility-related capability information,
       enable the second mobility management scheme to anchor the IP address of the terminal for performing a handover, and
       enable the first mobility management scheme to perform the handover.

11. The apparatus of claim 10, wherein the mobility-related capability information is used to determine at least one mobility management scheme for the terminal.

12. The apparatus of claim 10, wherein the at least one processor is further configured to:
    transmit a third message for requesting mobility-related capability information of a counterpart end that performs communications; and
    receive a fourth message including the mobility-related capability information of the counterpart end.

13. The apparatus of claim 12, wherein the third message is transmitted to a server that provides an IP address corresponding to a host name of the counterpart end.

14. The apparatus of claim 10, wherein the at least one processor is further configured to:

in response to a serving gateway changing from a first gateway to a second gateway due to movement of the terminal, request to anchor a first IP address allocated by the first gateway;

perform a handover from the first IP address to a second IP address allocated by the second gateway; and request to unanchor the first IP address.

15. The apparatus of claim 10, wherein the at least one processor is further configured to:

in response to a serving gateway changing from a first gateway to a second gateway due to movement of the terminal, transmit data through a first path via the first gateway while a handover procedure is performed; and after the handover is completed, transmit data through a second path via the second gateway.

16. The apparatus of claim 15, wherein the at least one processor is further configured to:

configure a source address of a transmitted packet as an IP address allocated by the first gateway, while transmitting of the data through the first path.

* * * * *